(12) United States Patent
Sacco et al.

(10) Patent No.: US 11,164,225 B2
(45) Date of Patent: Nov. 2, 2021

(54) METHODS AND SYSTEMS FOR DEPLOYING HIGH-VOLUME LISTINGS IN A NETWORK TRADING PLATFORM

(71) Applicant: EBAY INC., San Jose, CA (US)

(72) Inventors: Nathan Sacco, Los Gatos, CA (US); Sonia Wong, Sunnyvale, CA (US); Robert Erickson, Huntington Beach, CA (US)

(73) Assignee: eBay Inc., San Jose, CA (US)

( * ) Notice: Subject to any disclaimer, the term of this patent is extended or adjusted under 35 U.S.C. 154(b) by 195 days.

(21) Appl. No.: 16/502,872

(22) Filed: Jul. 3, 2019

(65) Prior Publication Data

US 2019/0325493 A1  Oct. 24, 2019

Related U.S. Application Data

(63) Continuation of application No. 14/300,012, filed on Jun. 9, 2014, now Pat. No. 10,387,929, which is a continuation of application No. 13/886,802, filed on May 3, 2013, now Pat. No. 8,762,244, which is a continuation of application No. 10/912,637, filed on Aug. 4, 2004, now Pat. No. 8,743,381.

(60) Provisional application No. 60/493,930, filed on Aug. 8, 2003, provisional application No. 60/492,717, filed on Aug. 4, 2003, provisional application No. 60/492,770, filed on Aug. 4, 2003.

(51) Int. Cl.
| G06Q 40/00 | (2012.01) |
| G06Q 30/06 | (2012.01) |
| G06Q 30/08 | (2012.01) |
| G06Q 40/04 | (2012.01) |

(52) U.S. Cl.
CPC ........ *G06Q 30/0601* (2013.01); *G06Q 30/06* (2013.01); *G06Q 30/08* (2013.01); *G06Q 40/04* (2013.01)

(58) Field of Classification Search
CPC .... G06Q 30/0601; G06Q 30/06; G06Q 30/08; G06Q 40/04
See application file for complete search history.

(56) References Cited

U.S. PATENT DOCUMENTS

| 6,519,571 B1 | 2/2003 | Guheen et al. |
| 7,110,967 B1 | 9/2006 | Espenes et al. |
| 7,263,515 B1 | 8/2007 | Tenorio et al. |

(Continued)

FOREIGN PATENT DOCUMENTS

| WO | 2001/016826 A1 | 3/2001 |
| WO | 2001/041526 A2 | 6/2001 |

(Continued)

OTHER PUBLICATIONS

Edeal Puts New Online Auction Tool in Sellers' Hands, PR Newswire; New York [New York]Feb. 8, 2000: 1. (Year: 2000).*

(Continued)

*Primary Examiner* — Lalita M Hamilton
(74) *Attorney, Agent, or Firm* — Faegre Drinker

(57) ABSTRACT

A method and system for deploying high volume listings in a network based commerce system are described. The system uploads listing data that includes a first listing. Next, the system creates a first profile and a second profile based on the listing data. Finally, the system automatically generates a second listing based on the first and second profiles.

20 Claims, 17 Drawing Sheets

(56) References Cited

U.S. PATENT DOCUMENTS

| | | | |
|---|---|---|---|
| 7,493,274 | B2 | 2/2009 | Bezos et al. |
| 8,428,996 | B2 | 4/2013 | Grove et al. |
| 8,473,381 | B2 | 6/2013 | Sacco et al. |
| 8,719,041 | B2 | 5/2014 | Veres et al. |
| 8,762,244 | B2 | 6/2014 | Sacco et al. |
| 10,387,929 | B2 | 8/2019 | Sacco et al. |
| 2003/0023514 | A1 | 1/2003 | Adler et al. |
| 2003/0083961 | A1 | 5/2003 | Bezos et al. |
| 2003/0200156 | A1 | 10/2003 | Roseman et al. |
| 2005/0033683 | A1 | 2/2005 | Sacco et al. |
| 2013/0332298 | A1 | 12/2013 | Sacco et al. |
| 2014/0289063 | A1 | 9/2014 | Sacco et al. |

FOREIGN PATENT DOCUMENTS

| | | | |
|---|---|---|---|
| WO | 2003/009105 | A2 | 1/2003 |
| WO | 2005/017687 | A2 | 2/2005 |
| WO | 2005/017687 | A3 | 3/2007 |
| WO | 2005/017687 | A8 | 4/2007 |

OTHER PUBLICATIONS

Advisory Action received for U.S. Appl. No. 14/300,112, dated Feb. 27, 2019, 2 pages.
Appeal-Brief received for U.S. Appl. No. 14/300,112, filed Sep. 23, 2015, 26 pages.
Applicant-Initiated Interview Summary received for U.S. Appl. No. 14/300,112, dated Dec. 21, 2018, 3 pages.
Applicant-Initiated Interview Summary received for U.S. Appl. No. 14/300,112, dated Jan. 30, 2019, 3 pages.
Applicant-Initiated Interview Summary received for U.S. Appl. No. 14/300,112, dated Sep. 28, 2018, 3 pages.
Applicant-Initiated Interview Summary received for U.S. Appl. No. 14/300,112, dated Nov. 14, 2014, 3 pages.
Decision on Appeal received for U.S. Appl. No. 14/300,112, dated Jan. 18, 2018, 17 pages.
Examiner's Answer to Appeal Brief received for U.S. Appl. No. 14/300,112, dated Mar. 11, 2016, 6 pages.
Final Office Action received for U.S. Appl. No. 14/300,112, dated Nov. 9, 2018, 13 pages.
Final Office Action received for U.S. Appl. No. 14/300,112, dated Feb. 4, 2015, 8 pages.
Non-Final Office Action received for U.S. Appl. No. 14/300,112, dated Apr. 19, 2018, 9 pages.
Non-Final Office Action received for U.S. Appl. No. 14/300,112, dated Jul. 9, 2014, 6 pages.
Notice of Allowance received for U.S. Appl. No. 14/300,112, dated Apr. 4, 2019, 5 pages.
Preliminary Amendment for U.S. Appl. No. 14/300,112, filed Jun. 19, 2014, 6 pages.
Reply-Brief filed for U.S. Appl. No. 14/300,112, filed May 10, 2016, 5 pages.
Response to Advisory Action filed on Feb. 27, 2019, for U.S. Appl. No. 14/300,112, dated Feb. 27, 2019, 3 pages.
Response to Final Office Action filed on Feb. 11, 2019, for U.S. Appl. No. 14/300,112, dated Nov. 9, 2018, 8 pages.
Response to Final Office Action filed on Mar. 19, 2018, for U.S. Appl. No. 14/300,112, dated Feb. 4, 2015, 8 pages.
Response to Non-Final Office Action filed on Jul. 18, 2018, for U.S. Appl. No. 14/300,112, dated Apr. 19, 2018, 17 pages.
Response to Non-Final Office Action filed on Nov. 10, 2014, for U.S. Appl. No. 14/300,112, dated Jul. 9, 2014, 17 pages.
Response to Non-Final Office Action filed on Sep. 19, 2018, for U.S. Appl. No. 14/300,112, dated Apr. 19, 2018, 13 pages.
U.S. Appl. No. 14/300,112, filed Jun. 9, 2014, Issued.
U.S. Appl. No. 13/886,802, filed May 3, 2013, Issued.
U.S. Appl. No. 10/912,637, filed Aug. 4, 2004, Issued.
Office Action received for European Patent Application No. 04780195.6, dated Jun. 11, 2014, 4 pages.
Office Action received for European Patent Application No. 04780195.6, dated Sep. 29, 2008, 5 pages.
Response to Office Action filed on Mar. 19, 2009, for European Patent Application No. 04780195.6, dated Sep. 29, 2008, 17 pages.
Response to Summons to Oral Proceedings filed on May 19, 2014, for European Patent Application No. 04780195.6, mailed on Feb. 17, 2014, 1 page.
Summons to Attend Oral Proceedings received for European Patent Application No. 04780195.6, mailed on Feb. 17, 2014, 7 pages.
Supplemental European Search Report received for European Patent Application No. 04780195.6, dated Mar. 28, 2008, 3 pages.
312 Amendment filed on May 1, 2013, for U.S. Appl. No. 10/912,637, 9 pages.
Advisory Action received for U.S. Appl. No. 10/912,637, dated Jan. 29, 2010, 4 pages.
Appeal Brief filed for U.S. Appl. No. 10/912,637, filed Apr. 29, 2010, 32 pages.
Decision on Appeal received for U.S. Appl. No. 10/912,637, dated Nov. 15, 2012, 7 pages.
Decision on Pre-Appeal Brief received for U.S. Appl. No. 10/912,637, dated Mar. 29, 2010, 2 pages.
Examiner's Answer received for U.S. Appl. No. 10/912,637, dated Jul. 22, 2010, 13 pages.
Final Office Action received for U.S. Appl. No. 10/912,637, dated Oct. 29, 2009, 6 pages.
Non-Final Office Action received for U.S. Appl. No. 10/912,637, dated Oct. 3, 2008, 11 pages.
Notice of Allowance received for U.S. Appl. No. 10/912,637, dated Feb. 22, 2013, 5 pages.
Notice of Non-Compliant Amendment received for U.S. Appl. No. 10/912,637, dated Apr. 16, 2009, 3 pages.
Pre-Appeal Brief Request filed on Jan. 29, 2010, for U.S. Appl. No. 10/912,637, 5 pages.
Preliminary Amendment filed on Aug. 5, 2008, for U.S. Appl. No. 10/912,637, 11 pages.
PTO Response to 312 Amendment received for U.S. Appl. No. 10/912,637, dated May 17, 2013, 2 pages.
Response to Final Office Action filed on Dec. 28, 2009, for U.S. Appl. No. 10/912,637, dated Oct. 29, 2009, 19 pages.
Response to Non-Final Office Action filed on Jan. 5, 2009, for U.S. Appl. No. 10/912,637, dated Oct. 3, 2008, 25 pages.
Response to Notice of Non-Compliant Amendment filed on Jun. 16, 2009, for U.S. Appl. No. 10/912,637, dated Apr. 16, 2009, 25 pages.
Office Action received for Korean Patent Application No. 10-2006-7002474, dated Jul. 31, 2007, 19 pages (including English Translation of claims).
Response to Office Action filed on Nov. 30, 2007, for Korean Patent Application No. 10-2006-7002474, dated Aug. 16, 2007, 101 pages (including English Translation of claims).
312 Amendment filed on May 2, 2014, for U.S. Appl. No. 13/886,802, 5 pages.
Non-Final Office Action received for U.S. Appl. No. 13/886,802, dated Oct. 10, 2013, 9 pages.
Notice of Allowance received for U.S. Appl. No. 13/886,802, dated Feb. 3, 2014, 5 pages.
Preliminary Amendment filed on May 7, 2013, for U.S. Appl. No. 13/886,802, 5 pages.
PTO Response to Rule 312 Communication received for U.S. Appl. No. 13/886,802, dated May 19, 2014, 5 pages.
Response to Non-Final Office Action filed on Jan. 10, 2014, for U.S. Appl. No. 13/886,802, dated Oct. 10, 2013, 7 pages.
Notice of Reexamination received for Chinese Patent Application No. 200480028775.4, dated Feb. 17, 2013, 9 pages (including English Translation of Claims).
Office Action received for Chinese patent Application No. 200480028775.4, dated Mar. 24, 2011, 10 pages (including English Translation of Claims).
Office Action received for Chinese patent Application No. 200480028775.4, dated Jan. 8, 2010, 21 pages (including English Translation of Claims).
Office Action received for Chinese patent Application No. 200480028775.4, dated Sep. 27, 2010, 11 pages (including English Translation of Claims).

(56) References Cited

OTHER PUBLICATIONS

Response to Office Action filed on Dec. 10, 2010, for Chinese Patent Application No. 200480028775.4, dated Oct. 21, 2010, 9 pages (including English Translation of Claims).
Response to Office Action filed on May 21, 2013, for Chinese Patent Application No. 200480028775.4, dated Mar. 19, 2013, 17 pages (including English Translation of Claims).
Response to Office Action filed on May 23, 2010, for Chinese Patent Application No. 200480028775.4, dated Feb. 4, 2010, 12 pages (including English Translation of Claims).
Voluntary Amendment filed on Feb. 19, 2008, for Chinese Patent Application No. 200480028775.4, 15 pages (including English Translation of Claims).
International Written Opinion received for PCT Application No. PCT/US2004/025315, dated Dec. 27, 2006, 3 pages.
International Preliminary Report on Patentability received for PCT Application No. PCT/US2004/025315, dated Feb. 1, 2007, 5 pages.
International Search Report received for PCT Application No. PCT/US2004/025315, dated Dec. 27, 2006, 3 pages.

* cited by examiner

| 910 Product Identifier | 920 Time Start | 930 Time End | 940 Duration | 950 Display Type | 960 Schedule Type | 970 Price Type | 980 Quantity Type | 990 Product Attribute |
|---|---|---|---|---|---|---|---|---|
| Product $A_0$ | 5/1/2005 | 7/3/2006 | Wed-Tues | 3 | A | PO4 | 115 | Fall |
| Product $A_1$ | • | • | • | • | • | • | • | • |
| Product $A_n$ | • | • | • | • | • | • | • | • |
| Product $B_0$ | • | • | • | • | • | • | • | • |
| • | • | • | • | • | • | • | • | • |
| • | • | • | • | • | • | • | • | • |
| • | • | • | • | • | • | • | • | • |
| • | • | • | • | • | • | • | • | • |
| • | • | • | • | • | • | • | • | • |
| Product $B_n$ | • | • | • | • | • | • | • | • |

Match Table 900

FIG. 9

| Staged Listing Criteria | | | | | | | |
|---|---|---|---|---|---|---|---|
| ☐ First Category | Includes ▽ | | | | | | |
| ☐ Second Category | Does Not Include ▽ | | | | | | |
| ☐ Next Listing Date | In range ▽ | From | Jan ▽ | | To | Jan ▽ | |
| ☐ SKU | Equals ▽ | | | | | | |
| ☐ Price Profile | Equals ▽ | | | | | | |
| ☐ Quantity Profile | Includes ▽ | | | | | | |
| ☐ Schedule Profile | Includes ▽ | | | | | | |
| ☐ Active Date - Start | In range ▽ | From | Jan ▽ | | To | Jan ▽ | |
| ☐ Active Date - End | In range ▽ | From | Jan ▽ | | To | Jan ▽ | |
| ☐ Created Date | In range ▽ | From | Jan ▽ | | To | Jan ▽ | |
| ☐ Status | Equals ▽ | ○●○●○● | | | | | |
| ☐ Merchant Category | Includes ▽ | | | | | | |
| ☐ Merchant Sub-Category | Includes ▽ | | | | | | |
| ☐ Display Profile | Includes ▽ | | | | | | |

FIG. 13

| Auction Performance Criteria | | | | | |
|---|---|---|---|---|---|
| ☐ Conversion rate - Last Cycle | In range ▽ | From | | % To | % |
| ☐ Conversion rate - To Date | In range ▽ | From | | % To | % |
| ☐ ASP/Target - Last Cycle | In range ▽ | From | | % To | % |
| ☐ ASP/Target - To Date | In range ▽ | From | | % To | % |

| Staged Listing Criteria | | | | |
|---|---|---|---|---|
| ☐ First category | Includes ▽ | | | |
| ☐ Second category | Does Not Include ▽ | | | |
| ☐ Next Listing Date | In range ▽ | From Jan ▽ | | To Jan ▽ |
| ☐ SKU | Equals ▽ | | | |
| ☐ Price Profile | Equals ▽ | | | |
| ☐ Quantity Profile | Includes ▽ | | | |
| ☐ Schedule Profile | Includes ▽ | | | |
| ☐ Active Date - Start | In range ▽ | From Jan ▽ | | To Jan ▽ |
| ☐ Active Date - End | In range ▽ | From Jan ▽ | | To Jan ▽ |
| ☐ Created Date | In range ▽ | From Jan ▽ | | To Jan ▽ |
| ☐ Status | Equals ▽ | ○●○●○● | | |
| ☐ Merchant Category | Includes ▽ | | | |
| ☐ Merchant Sub-Category | Includes ▽ | | | |
| ☐ Display Profile | Includes ▽ | | | |

FIG. 14

| PRODUCT ATTRIBUTE MODULE 524 | | | |
|---|---|---|---|
| Pricing Data | MSRP: | $ | ☐ |
| | COGS: | $ | ☐ |
| | Default Starting Price: | $ | ☐ |
| | Default Reserve Price: | $ | ☐ |
| | Default Auction BIN Price: | $ | ☐ |
| | Default Store BIN Price: | $ | ☐ |
| Item Location | City, State : | [_____] e.g., San Francisco, CA | ☐ |
| | Region: | Select One ▼ | ☐ |
| Shipping & Handling Costs | Shipping costs are applicable for domestic shipping only. | | |
| | Ground: | $ | ☐ |
| |    Each Additional Item: | $ | ☐ |
| | Express: | $ | ☐ |
| |    Each Additional Item: | $ | ☐ |
| | Overnight: | $ | ☐ |
| |    Each Additional Item: | $ | ☐ |
| | Shipping Insurance: | $ [____] Not offered ▼ | ☐ |
| Product Specifications | Height: | [____] in. ▼ | ☐ |
| | Width: | [____] in. ▼ | ☐ |
| | Depth: | [____] in. ▼ | ☐ |
| | Weight: | [____] lb. ▼ | ☐ |
| | Unit of Measure: | [____] | ☐ |

METHODS AND SYSTEMS FOR DEPLOYING HIGH-VOLUME LISTINGS IN A NETWORK TRADING PLATFORM

RELATED APPLICATIONS

This application is a continuation of and claims benefit of priority to U.S. patent application Ser. No. 14/300,112, filed on Jun. 9, 2014, which is a continuation of and claims benefit of priority to U.S. patent application Ser. No. 13/886,802, filed on May 3, 2013, now U.S. Pat. No. 8,762,244, issued Jun. 24, 2014, which is a continuation of and claims benefit of priority to U.S. application Ser. No. 10/912,637, filed on Aug. 4, 2004, now U.S. Pat. No. 8,473,381, issued Jun. 25, 2013, which claims benefit of priority of U.S. Provisional Application No. 60/492,717, filed on Aug. 4, 2003, U.S. Provisional Application No. 60/492,770, filed on Aug. 4, 2003, and U.S. Provisional Application No. 60/493,930, filed on Aug. 8, 2003, each of which are incorporated herein by reference in their entirety.

TECHNICAL FIELD

Exemplary embodiments of the present disclosure relate generally to the technical field of commerce automation and, in one exemplary embodiment, to methods and systems to automate the creation of a listing for a network-based commerce system.

BACKGROUND

Network-based marketplaces have become increasingly popular venues for the buying and selling of goods and services as communication speeds and processing power have enabled the adoption of the Internet in everyday society. As such, traditional high-volume sellers (e.g., large department stores, wholesalers, warehouse clubs, manufacturers, etc.) have become empowered with a medium on which to sell their goods and services. These high-volume sellers find it difficult to integrate existing infrastructure and sales support mechanisms (e.g., ERP systems, advanced planning systems, sales order management systems, etc.) into the network-based marketplace environment because of a lack of scalable solutions to administer their need to sell products in high volume. Network-based marketplaces have traditionally focused on small consumers who only occasionally list items for sale. High-volume sellers, while still wanting to leverage the visibility of large network-based trading marketplaces, find that network-based marketplaces do not adequately support the administration and management of their transactions because of insufficient integration with their existing business processes.

Technology to aid high-volume sellers with their transaction processes has largely been limited to manual offline management systems (e.g., spreadsheets, databases, etc.), and disparate product listing management systems (e.g., listing of one product at a time, or a service for listing products that is independent from the network-based trading marketplace). Manual offline management systems may require that sellers input data twice, and constantly devote time and resources to updating databases and spreadsheets offline from individual network-based trading systems.

Similarly, disparate product listing management systems are inefficient because they do not allow scalability of business processes and do not integrate well with the infrastructure of most high-volume sellers. As a result, high-volume sellers are not able to effectively leverage network-based trading systems because they are often unable to keep up with the demand on their limited time to manage listings (e.g., investment required exceeds budget), and service levels within a network-based trading system suffer (products do not get shipped, fraudulent buyers are disguised, etc.).

In order to make a network-based trading environment more meaningful for high-volume sellers, there is some incentive for operators to provide systems for rapidly deploying listings to buyers in a network-based trading marketplace. However, the design of such integrated systems present a number of technical challenges, specifically regarding how databases are organized and how hardware architecture is designed and/or implemented to manage such listings. Further, a number of technical challenges exist with respect to the automation of large numbers of listings that are received at once because scheduling, delivering, and posting must be integrated with a plurality of internal and external databases that must be synchronized in order to list products effectively.

SUMMARY

A method and system for managing listings within a network-based trading environment are provided.

In accordance with one aspect of the disclosure, there is provided a method to automate the creation of a listing for a network-based commerce system, the method including: identifying user selection of a first profile relating to a first aspect of a listing; identifying user selection of a second profile relating to a second aspect of the listing; storing the user selections of the first and second profiles; and automatically generating the listing utilizing the first and second profiles.

Each of the first and second profiles may be selected from a first and a second set of profiles, respectively. The first aspect may include any one of a group of listing aspects including a pricing aspect, a display aspect, a product aspect, a quantity aspect, and a schedule aspect.

The method may include receiving input from the user to define the first profile. In one embodiment, the first profile may be created through a web-based user input module. The first profile may be created by automatic extraction from an enterprise resource planning system by a bulk uploader (e.g., any device or application that uploads multiple listing data during an upload session).

In accordance with another aspect of the disclosure, there is provided a system for managing listings within a network-based trading environment, the system including: a merchant tool module to automatically associate a plurality of defined characteristics with a listing; and a timing module to automatically generate a listing based on a schedule.

The system may include a bulk uploader to access and perform an integrity check on inventory associated to a plurality of databases across a plurality of network-based trading environments.

In one embodiment, at least one of the plurality of defined characteristics are seasonal characteristics defining how an associated listing will appear on the network-based trading environment, and layout display characteristics defining a visual layout of a listing viewed by a user of the network-based trading environment.

In one embodiment, at least one of the plurality of defined characteristics may be a predefined product attribute stored in a product module. At least one of the predefined characteristics may be a price level selected by a user, the price level specifying a price at which a listing is released on the network-based trading environment.

The system may include an alert module to automatically notify a seller that at least one of the plurality of characteristics cannot be associated with the proposed listing because of an error in associating the characteristic with the listing.

In one embodiment, the system includes a jitter application to provide time jittered listings of multiple ones of a common product that are simultaneously listed. The system may include a status generator to provide information about a particular display characteristic within the plurality of defined characteristics. In one embodiment, the system includes a user interface module to receive input regarding at least one of the defined characteristics and to track metrics from at least one of a group including profit, loss, revenue, seasonal preference, and listing effectiveness.

In accordance with a further aspect of the disclosure, there is provided a system for managing listings within a network-based trading environment, the system including: means for automatically associating a plurality of defined characteristics with a listing; and means for generating a listing based on a schedule.

In accordance with a further aspect of the disclosure, there is provided a method to automatically process listings in a network-based trading system, the method including: automatically associating a plurality of defined characteristics with a proposed listing within the network-based trading system; and automatically generating a listing based on the proposed listing.

The method may include including accessing and performing an integrity check on inventory associated to a plurality of databases across a plurality of network-based trading environments. In one embodiment, at least one of the plurality of defined characteristics are automatically generated for seasonal characteristics defining how an associated listing will appear on the network-based trading system, and layout display characteristics defining a visual layout of a listing viewed by a user of the network-based trading system.

At least one of the plurality of defined characteristics may be a predefined product attribute stored in a product module. At least one of the predefined characteristics may be a price level selected by a user, the price level specifying a price at which a listing is released on the network-based trading system. The method may include automatically notifying sellers that at least one of the plurality of characteristics cannot be associated with the proposed listing because of an error in associating the characteristic to the listing.

Still further in accordance with the disclosure, there is provided a method of managing listings of a high-volume seller, the method including: consolidating product attribute data pertaining to a high volume seller in a database, the product attribute data being organized into categories based on a plurality of defined characteristics; and generating at least one report based on the characteristics, the reports being accessible to the seller through a dashboard view.

In one embodiment, the reports are customizable for different service levels offered to the seller. The method may include bulk uploading inventory to a plurality of databases across a plurality of network-based trading environments.

In one embodiment, the at least one report may include an average selling price report and an average time to sell report for the seller. The categories may include geographical and time phased markers.

In accordance with a further aspect of the disclosure, there is provided an apparatus in a network-based trading platform, the apparatus including: a bulk uploader having an integrity check algorithm that receives input regarding product information by automatically retrieves product information from at least one database at a seller and automatically applying at least one password access algorithm; and a pre-listing management module having a plurality of defined characteristics that include at least some information for a new listing.

In one embodiment, the pre-listing management module may be to synchronize inventory associated to a plurality of databases across a plurality of network-based trading environments. The pre-listing management module may be to track metrics selected from a group including at least one of profit, loss, revenue, seasonal preference, and listing effectiveness. At least some information in the new listing may be selected for reuse as a defined characteristic. In one embodiment, the characteristics may be grouped into categories each having a set of auction parameters. The categories may be at least one of listing title, starting price, payment options, quantity options, display options, and schedule options.

Still further in accordance with the disclosure, there is provided a method for managing proposed listings for subsequent listing in a network-based trading system, the method including: aggregating a set of external inventory tables into a multiplexed table based on indexed time identifiers applied to each of the set of external inventory tables; separating the multiplexed table into individual products; receiving input of a plurality of predefined characteristics from a user input module; and associating chosen characteristics to individual products by applying a jitter algorithm.

The disclosure extends to a machine-readable medium storing a set of instructions that, when executed by the machine, cause the machine to perform any one or more of the methods described herein.

Other features of the present disclosure will be apparent from the accompanying drawings and from the detailed description that follows.

BRIEF DESCRIPTION OF THE DRAWINGS

The present disclosure is illustrated by way of example and not limitation in the figures of the accompanying drawings, in which like references indicate similar elements and in which:

FIG. 9 is an exemplary table, which may be stored within the merchant tool module, including information about various products and profiles of those products to be listed on a network-based trading marketplace, according to one exemplary embodiment.

FIGS. 11-15 illustrate exemplary user interfaces (UIs) presented to a user of the network-based trading system, according to various exemplary embodiments.

DETAILED DESCRIPTION

A method and system to automate the creation and/or management of a listing for a network-based commerce system is provided. In one embodiment, the method and system creates and/or manages high-volume listings within a network-based trading environment. The method and system may include a logic module to automatically associate a plurality of defined characteristics to a listing and a timing module to automatically generate a staged listing based on an operation period defined, for example, by a schedule. In the following description, for purposes of explanation, numerous specific details are set forth in order to provide a thorough understanding of the present disclosure. It will be evident, however, to one skilled in the art that the present disclosure may be practiced without these specific details.

Figure 1:
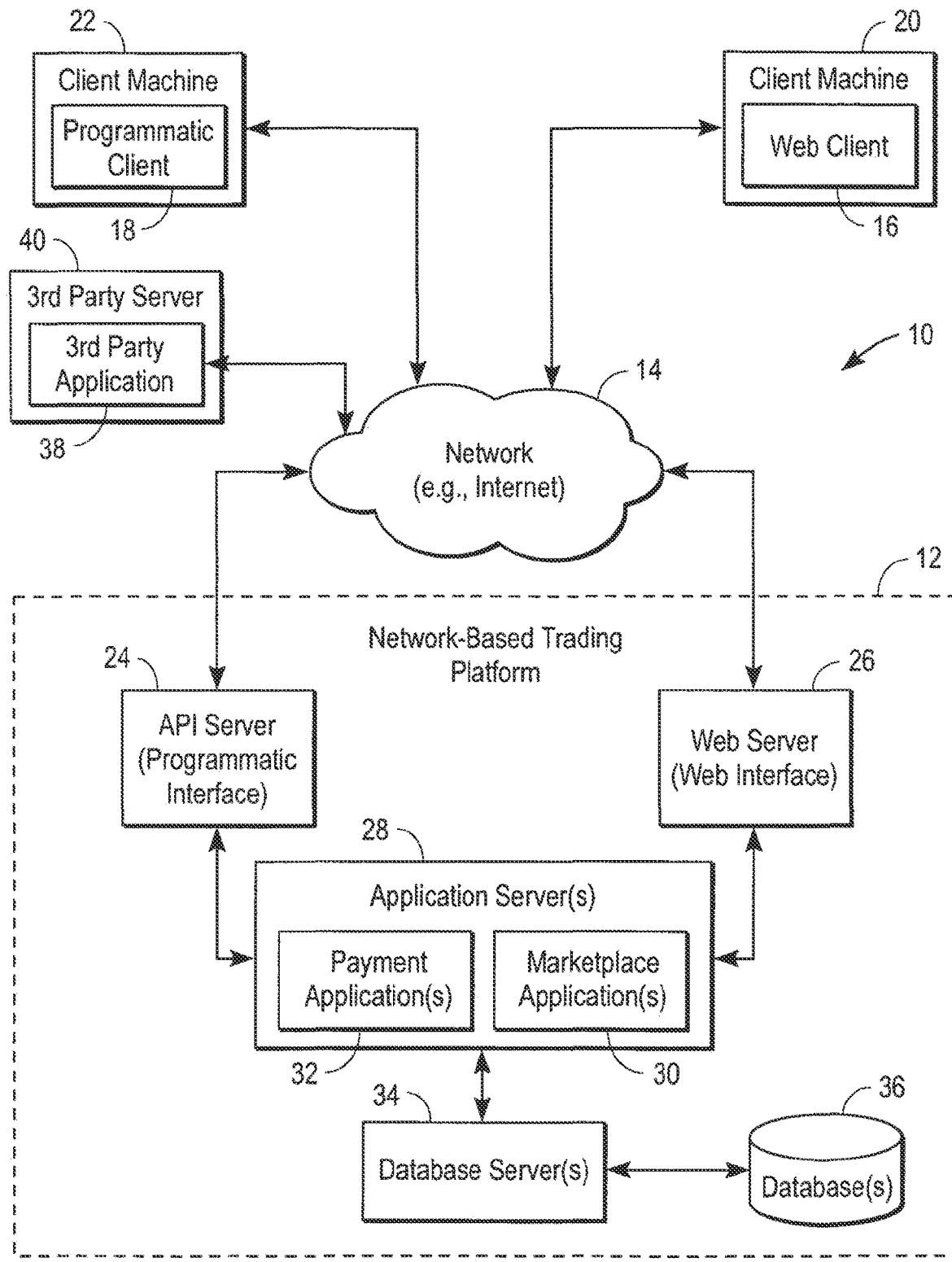
FIG. 1 is a network diagram depicting a commerce system, according to one exemplary embodiment.

FIG. 1 is a network diagram depicting a system 10, according to one exemplary embodiment, having client-server architecture. A commerce platform 12, in the exemplary form of a network-based marketplace or trading platform 12, provides server-side functionality, via a network 14 (e.g., the Internet) to one or more clients. FIG. 1 illustrates, for example, a web client 16 (e.g., a browser, such as the INTERNET EXPLORER browser developed by Microsoft Corporation of Redmond, Washington State), and a programmatic client 18 executing on respective client machines 20 and 22.

Turning specifically to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 provide a number of marketplace functions and services to users that access the marketplace 12 (e.g., post-sales management functions). The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments, the payment applications 32 may form part of a payment service that is separate and distinct from the marketplace 12.

Further, while the system 10 shown in FIG. 1 employs client-server architecture, the present disclosure is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via a web interface supported by the web server 26. Similarly, the programmatic client 18 accesses the various services and functions provided by the marketplace and payment applications 30 and 32 via a programmatic interface provided by the API Server 24. The programmatic client 18 may, for example, be a seller application (e.g., the Turbo Lister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API Server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 2:
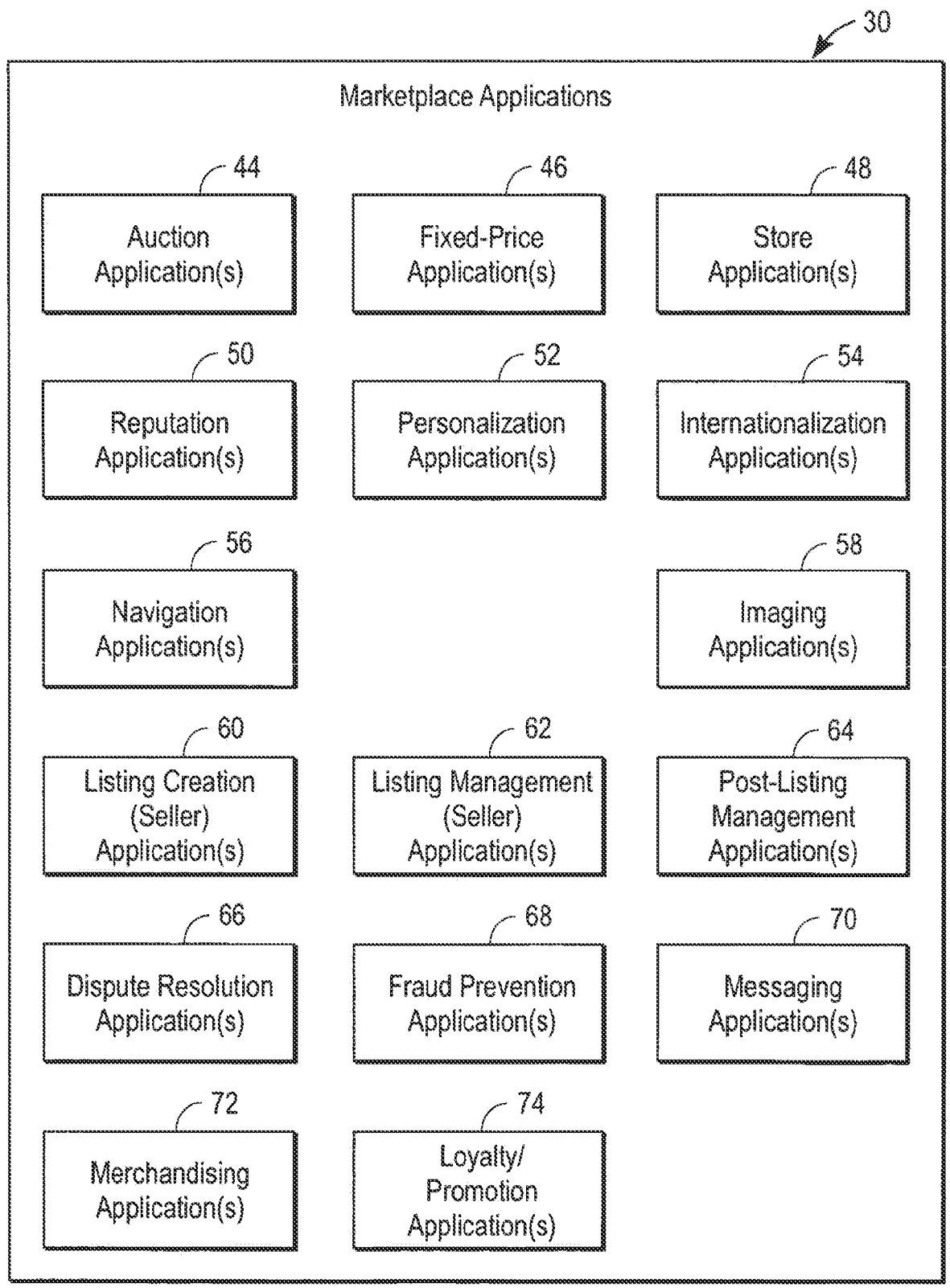
FIG. 2 is a block diagram illustrating marketplace applications provided as part of a network-based trading platform applications, according to one exemplary embodiment.

FIG. 2 is a block diagram illustrating the marketplace applications 30 that, in one exemplary embodiment, are provided as part of the network-based trading platform (network-based marketplace) 12. The marketplace 12 may provide a number of listing and price-setting mechanisms whereby a seller may list goods and/or services (e.g., for sale), a buyer can express interest in or indicate a desire to purchase such goods and/or services, and a price can be set for a transaction pertaining to the goods and/or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilize the appropriate personalization application 52, create a personalized reference page at which information regarding transactions to which the user is (or has been) a party may be viewed. Further, the personalization application 52 may enable a user to personalize listings and other aspects of their interactions with the marketplace 12 and other parties.

Internationalization applications 54 allow users of the marketplace 12 to customize various aspects of the marketplace 12 for geographic considerations. In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings available via the network-based marketplace 12, as visually informing and attractive as possible, the marketplace applications 30 may include one or more imaging applications 58 utilizing which users may upload images for inclusion within listings. The imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods and/or services that they wish to transact via the marketplace 12, and listing management applications 62 allow sellers to manage such listings. Specifically, where a particular seller has authored and/or published a large number of listings, the management of such listings may present a challenge.

The listing management applications 62 provide a number of features (e.g., automatic-relisting, inventory level monitors, etc.) to assist the seller in managing such listings. In one embodiment, the listing creation applications 60 may include a pre-sales management logic (not shown) having a set of one or more templates (e.g., reusable pre-arrangements of data that can be applied to future listings). These templates may be created by a seller from scratch, or may be created from existing listings. In one embodiment, templates may include all information included in a preexisting listing. In another embodiment, information in a first listing may be selected by a user and reused for future listings (e.g., a user may not have to elect to use all portions of a listing to include within a template). A user may alternatively select multiple products to leverage the same template when listing items for sale (e.g., a seller might use a standard template for a group of products or services with similar attributes). Furthermore, the templates may be grouped into products having their own set of auction parameters (e.g., specific to the laws and customs of a particular nation, stock keeping unit parameters, categories, durational limitations, etc.). The categories may include geographical (e.g., which country something is to be sold in) and time phased markers (e.g., time limits for listing and/or a unique marker within the listing) according to one embodiment. In one embodiment, these templates are stored within a pre-listing management logic module within the network-based marketplace 12. In one embodiment, the pre-listing management logic is to synchronize inventory associated to a plurality of databases across a plurality of network-based trading environments.

One or more post-listing management applications 64 may also assist sellers with a number of activities that typically occur post-listing. For example, upon completion of an auction facilitated by one or more of the auction applications 44, a seller may wish to leave feedback regarding a particular buyer. To this end, the post-listing management application 64 may provide an interface to one or more of the reputation applications 50, so as to allow the seller conveniently to provide feedback regarding multiple buyers to the reputation applications 50. In addition, the post-listing management application 64 may provide for measuring and monitoring post-sales conditions within a network-based trading module by interacting with the auction application 44 and the store application 48 according to one embodiment of the disclosure.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example, advising users regarding the status of listings at the marketplace 12 (e.g., providing "outbid" notices to bidders during an auction process or to provide promotional and merchandising information to users).

Merchandising applications 72 may support various merchandising functions that are made available to sellers to enable sellers to increase sales via the marketplace 12. The merchandising applications 72 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed. It is to be appreciated that different embodiments of the disclosure may include additional applications, exclude one or more of the exemplary applications, or include different combinations of applications.

Data Structures

Figure 3:
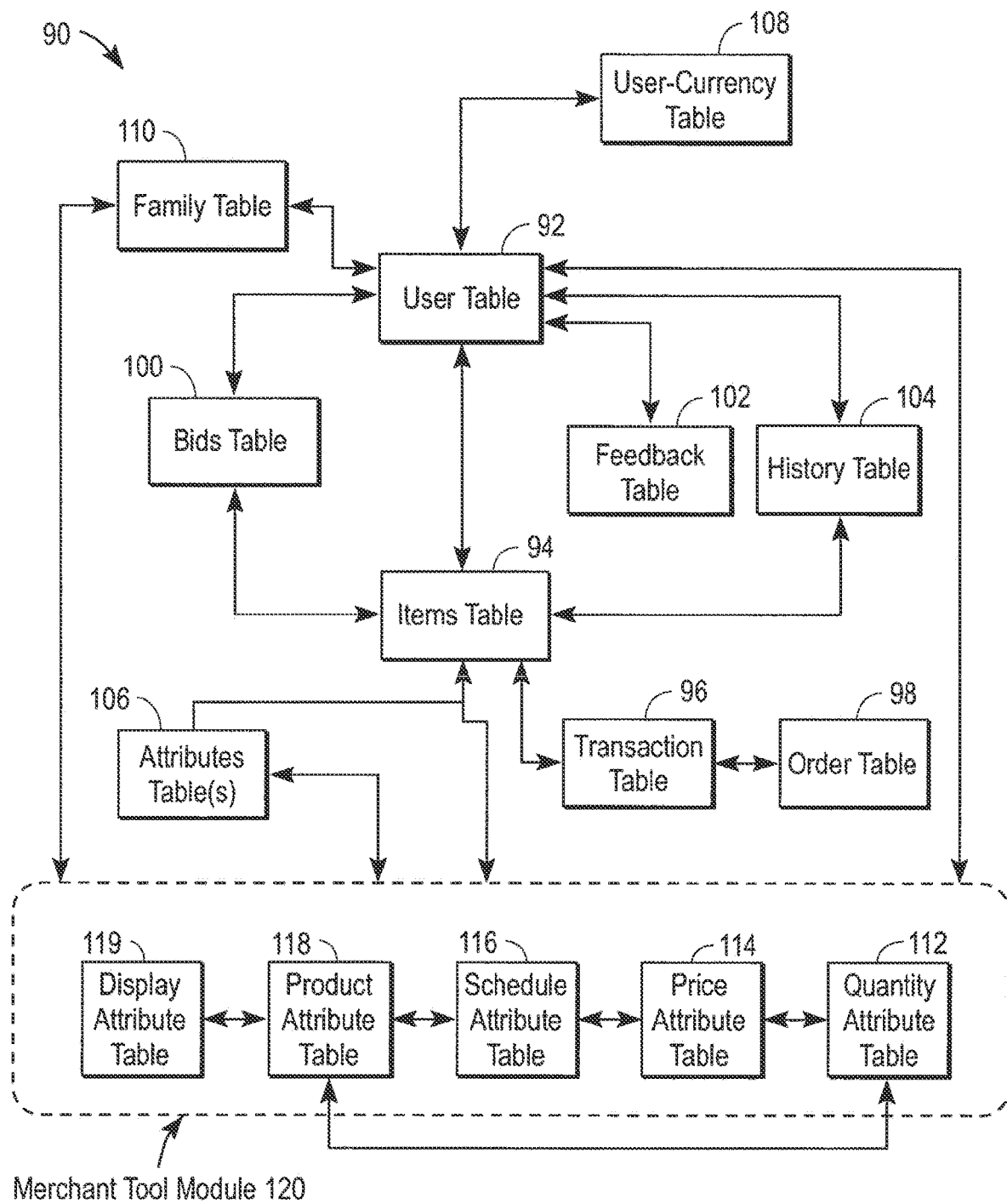
FIG. 3 is a high-level entity relationship diagram, illustrating various tables that may be leveraged by a network-based marketplace including a collection of tables accessed and utilized by a merchant tool module, according to one exemplary embodiment.

FIG. 3 is a high-level entity-relationship diagram, illustrating various tables 90 that may be maintained within the databases 36, and that are utilized by and support the marketplace and payment applications 30 and 32. A user table 92 includes a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and/or services that are available to be, or have been, transacted via the marketplace 12. Each item record (e.g., listing) within the items table 94 may furthermore be linked to one or more user records within the user table 92, so as to associate a seller and one or more actual or potential buyers with each item record.

A transaction table 96 includes a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transaction table 96.

Bid records within a bids table 100 each relate to a bid received at the network-based marketplace 12 in connection with an auction-format listing supported by the auction application 44. A feedback table 102 may be utilized by one or more of the reputation applications 50, in one exemplary embodiment, to construct and maintain reputation information concerning users. A history table 104 may maintain a history of transactions to which a user has been a party. One or more attributes tables 106 may record attribute information pertaining to items for which records exist within the items table 94. Considering only a single example of such an attribute, the attributes tables 106 may indicate a currency attribute associated with a particular item/listing, the currency attribute identifying the currency of a price for the relevant item as specified in by a seller.

Various attributes (e.g., characteristics of a particular item to be listed) are stored within tables accessed and utilized by a merchant tool module 120. Specifically, illustrated are a quantity attribute table 112, a price attribute table 114, a schedule attribute table 116, a product attribute table 118, and a display attribute table 119. Each one of these tables includes attribute information that can be applied to a new listing (e.g., a new listing for a pair of hand-gloves might leverage a particular quantity attribute of two within the quantity attribute table 112 to generate one or more new listings for the pair of hand gloves). Each attribute table accessed by the merchant tool module 120 may be coupled to one another (e.g., to allow a data to be shared between the tables). In one embodiment, a unique identifier field may exist within the attribute tables accessed by the merchant tool module 120. The attribute tables accessed by the merchant tool module 120 may be coupled to the user table 92 (e.g., to allow a user to input information into the attribute tables accessed by the merchant tool module 120). Furthermore, the attribute tables accessed by the merchant tool module 120 may also be coupled to the attribute tables 106 (e.g., the attribute table 106 may contain attribute information other than for listing items for sale) which generally reside within the network-based marketplace 12 as illustrated with reference to FIG. 1. In one embodiment, the attribute tables accessed by the merchant tool module 120 may be stored within an attributes table 106.

The tables accessed by the merchant tool module 120 may also be coupled to the items table 94 within the network-based marketplace 12 (e.g., to relate a particular listing attribute to a predetermined category within the network-based trading environment) and the family table 110. As such, high-volume sellers can generate new listings or place items for sale within the network-based marketplace (e.g., trading platform) 12 by using the data within the attribute tables accessed by the merchant tool module 120 to create customized bulk listings. For example, the individual tables accessed by the merchant tool module 120 may contain characteristics that are seasonal (e.g., clearance price for the holiday left-over goods or back-to-school bundles for the spring season) or related to the timing of and price (e.g., the schedule attribute table 116 might contain information about which days of the week an item is to be listed) of a particular type of product to be listed.

The display attribute table 119 may include various HTML-based style sheets for certain types of products that can be selected and individually applied to a particular new listing (e.g., red and yellow color scheme for the autumn or bright yellow background for the summer season). The product attribute table 118 may contain associations for preferred types of the display attributes or a quantity attribute for a particular type of product to be listed (e.g., the product attribute table 118 might include preferred characteristics such as season to be listed or quantity of nails to be sold with a particular type of a hammer that is used for summer outdoor work). The schedule attribute table 116 contains the timing/durational aspects of a particular listing (e.g., which days of the week a particular listing is to run). The price attribute table 114 may contain attributes of price that associate how a particular product is to be priced within the network-based marketplace 12 (e.g., the suggested retail price might be used in the peak selling season, or a clearance price may be used in the low selling seasons). The quantity attribute table 112 may contain an association of a particular quantity to be listed (e.g., at a given schedule) for a variety of the product attributes 118. As such, the product attribute table 118 is connected to and communicates with the quantity attribute table 112 (e.g., a particular product might have a preferred quantity that is to be sold with the item). Thus, for example, the various tables may provide the timing, price quantity, display, and the like of a listing.

Figure 4:
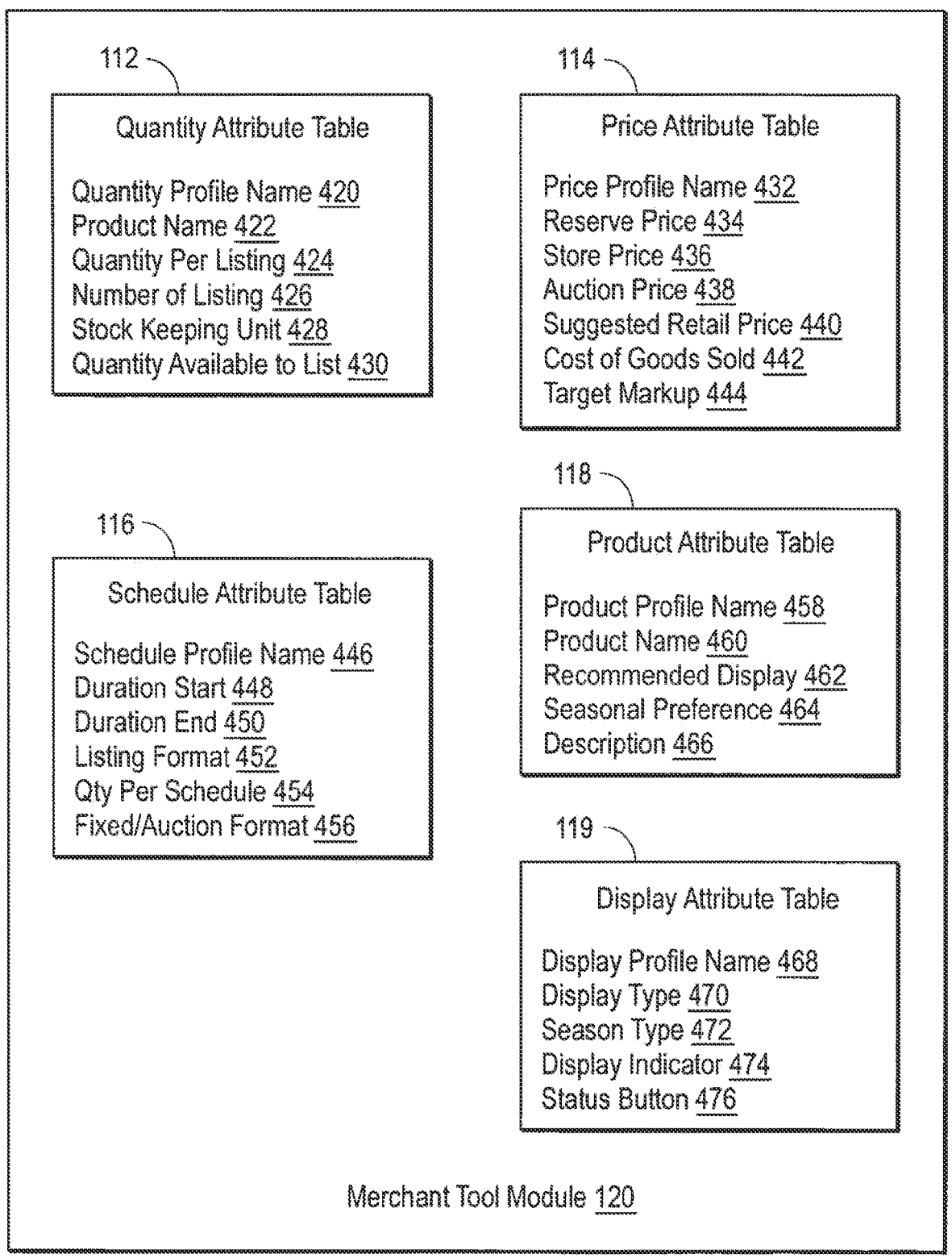
FIG. 4 shows various exemplary fields within the tables accessed and utilized by the merchant tool module, according to one exemplary embodiment.

FIG. 4 illustrates fields within exemplary tables accessed by the merchant tool module 120 according to one exemplary embodiment. The quantity attribute table 112 includes fields including, but not limited to, a quantity profile name 420, a product name 422, a quantity per listing 424, a number of listing 426, a stock keeping unit 428, and a quantity available to list 430. As described above, each one of these fields may be used to generate and customize a new listing (e.g., the stock keeping unit 428 might indicate that six pairs of socks are sold together). The price attribute table 114 may include a price profile name 432, a reserve price 434, a store price 436, an auction price 438, a suggested retail price 440, a costs of goods sold 442, and a target markup 444 (e.g., a field within the price attribute table 114 might include various pricing options that can be applied to a particular listing on a network-based marketplace 12). The schedule attribute table 116 may include a schedule profile name 446, a duration start 448, a duration end 450, a listing format 452, a quantity per schedule 454, and a fixed/auction format 456. As described with respect to the quantity attribute table 112 and the price attribute table 114, the schedule attribute table 116 might contain characteristics that a high volume seller can use to list items for sale (e.g., a high volume seller defined to be a seller who lists more than one item for sale within a network-based marketplace per month). The product attribute table 118 may include a product profile name 458, a product name 460, a recommended display 462, a seasonal preference 464, and a description 466. Similarly, the display attribute table 119 may include a display profile name 468, a display type 470, a season type 472, a display indicator 474, and a status button 476. As such, each one of the exemplary fields and tables shown in FIG. 4 include characteristics that can be applied to listings by a high-volume seller of goods and/or services. In one embodiment, the attribute tables accessed by the merchant tool module 120 may be applied to high-volume listings (e.g., a high-volume listing may be a particularly popular item at a retailer that is sold frequently such as once a day, or few times per week over a period of one month or one year), in which one or more listings that are frequently generated by a particular seller, who may be a high-volume seller). It will be appreciated that the attribute tables need not be located in the merchant tool module 120 but may be located anywhere on the network-based trading marketplace.

Figure 5:
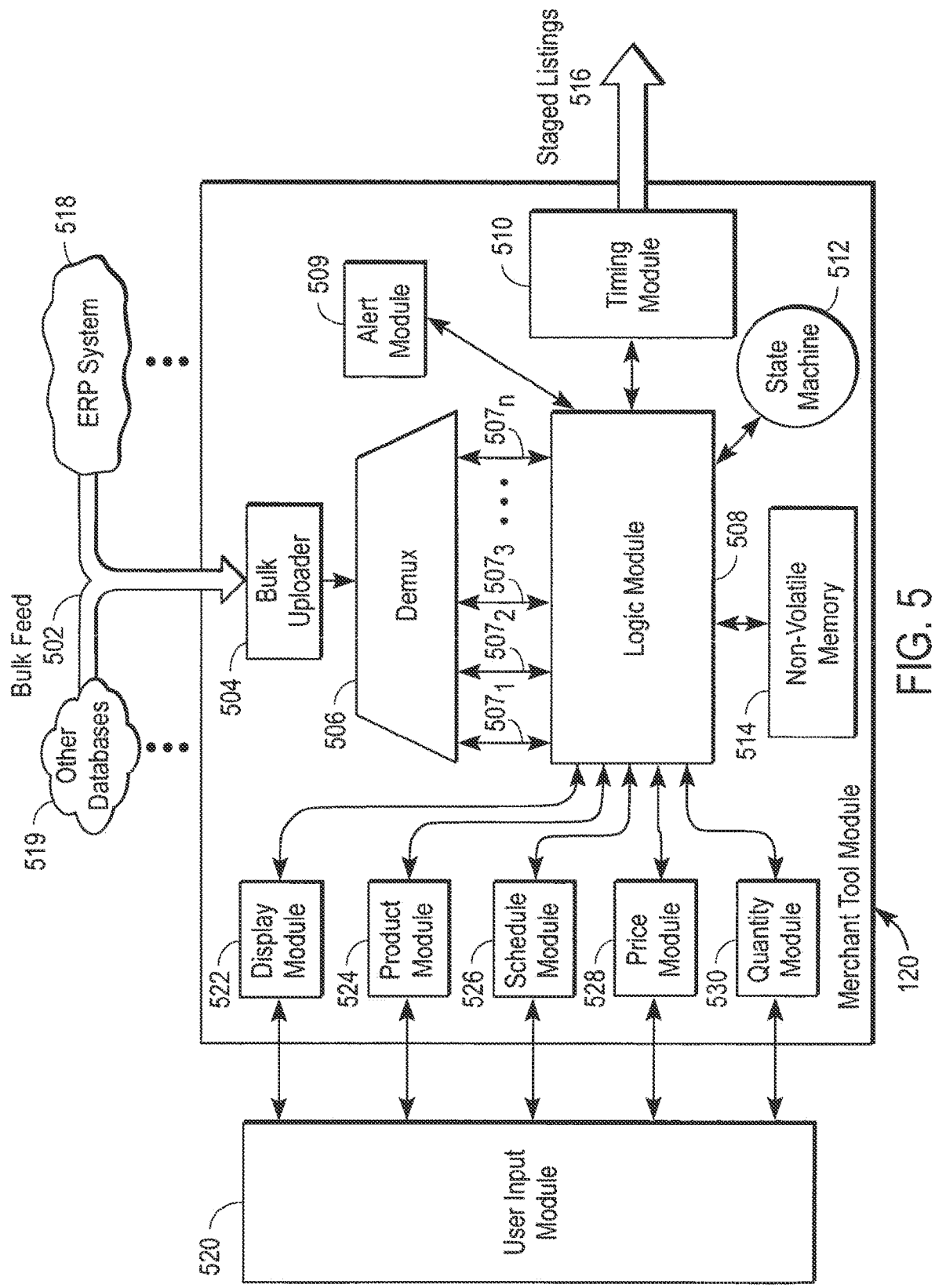
FIG. 5 shows an exemplary functional view of the merchant tool module, according to one exemplary embodiment.

FIG. 5 illustrates one exemplary embodiment of the merchant tool module 120 in a functional view. The merchant tool module 120 includes a display module 522, a product module 524, a schedule module 526, a price module 528, and a quantity module 530 as well as a bulk uploader 504, a demux 506, a logic module 508, a non-volatile memory 514, a state machine 512, and a timing module 510. In one embodiment the display module 522 includes the display table 119 as described by way of example in FIG. 3 and FIG. 4. Similarly, in other embodiments, the product module 524, the schedule module 526, the price module 528, and the quantity module 530 might include the various exemplary tables as shown in FIG. 4. For example, the product module 524 may include the product attribute table 118, the schedule module 526 might include the schedule attribute table 116, the price module 528 might include the price attribute table 114, and the quantity module 530 might include the quantity attribute table 112.

A user input module 520 and at least one ERP system 518 (e.g., more than one ERP system 518 may also be feed into the merchant tool module 120 through the bulk uploader 504) may be external to the merchant tool module 120. The ERP system 518 may be an enterprise-resource-planning system of a high-volume seller of goods in one embodiment. The ERP system 518 may alternatively be a spreadsheet or any other form of a database that includes data relevant to a listing on a network-based trading marketplace. The bulk uploader 504 may receive product information from the ERP system 518 and/or other databases 519. In one embodiment, multiple ones of the ERP systems 518 and/or databases 519 fed into the bulk uploader 504. The bulk uploader 504 may check the integrity of the data received from the ERP system 518 by ensuring that the data matches the format for fields required for a particular network-based marketplace (e.g., trading platform) 12, and upon completing these integrity checks, may input data received into a data aggregator or demux 506. In one embodiment, the bulk uploader 504 is a separate module that accesses and performs integrity checks on inventory associated with a plurality of databases across a plurality of network-based trading environments.

In another embodiment, the bulk uploader 504 may receive input regarding product information by automatically spidering or retrieving product information from at least one database at a seller and automatically applying at least one password access algorithm. For example, the bulk uploader 504 may automatically access and input password information to gain access to a plurality of databases at a high-volume seller, and may periodically "spider", or search to determine whether there have been new databases added by a particular high-volume seller that need to be indexed and periodically monitored for uploading product information into the merchant tool module 120 through the bulk uploader 504. In one embodiment, a user through a user input module 520 may set one or more characteristics by manually inputting the data through an input device. In another embodiment, the user input module 520 may receive input regarding at least one of the defined characteristics and may track metrics from a group including profit, loss, revenue, seasonal preference, and listing effectiveness, as described with reference to FIG. 14. Once the demux 506 receives data from the bulk uploader 504, the demux 506 parses a single file that may be uploaded from the ERP system 518 into the merchant tool module 120 into individual products 507 that can be interpreted by the logic module 508. These individual products 507 may be transmitted from the demux 506 to the logic module 508 for processing. It should be noted that the demux 506 is merely illustrative, and implementations of the present disclosure may or may not require the use of demux 506. Alternatively, any operation that can separate a table having multiple products into individual products may be used in place of demux 506.

Once the logic module 508 receives data on the individual products 507, the logic module 508 may use the non-volatile memory 514 and the state machine 512 to assign and arrange the individual products 507. The individual products (or listings) 507 may be assigned and/or arranged based upon one or more characteristics within the display module 522 and/or the product module 524 and/or the schedule module 526 and/or the price module 528 and/or the quantity module 530. The logic module 508 automatically assigns characteristics to a particular listing according to one embodiment. The operation of the logic module 508 in performing various functions to prepare an item to be listed will be described in greater detail with reference to FIG. 6). In one embodiment, the logic module 508 may be a pre-listing management logic module that may receive a plurality of defined characteristics and may include at least some of the defined characteristics to prepare a new listing.

In one exemplary embodiment, the user input module 520 may allow a particular user who schedules listings to select a particular characteristic to be applied to any one or more listings $507_1$ to $507_n$ received from the demux 506 into the logic module 508 (e.g., the user input module 520 may be a web based interface used to preselect a particular type of characteristic as shown in FIG. 14). In another embodiment, the user input module 520 may contain a client-server based user interface (e.g., a standalone application that communicates with the Internet) from which a particular user can input their criteria for what they would like to see on a particular listing that has been uploaded from the ERP system 518. For example, the criteria may be based upon the preset attributes within each one of the modules 522, 524, 526, 528, and 530 such as display season, duration, etc. In one embodiment, the non-volatile memory 514 may store one or more products $507_1$ to $507_n$ received from demux 506, and may store a characteristic applied version of one or more of products $507_1$ to $507_n$. For example, the non-volatile memory 514 may store listings of products after the logic module 508 has associated a particular characteristic to one or more of products $507_1$ to $507_n$. As such, the logic module 508 associates individual products to attributes that have been predefined by a user in one embodiment.

Also shown in FIG. 5, the logic module 508 may be coupled to an exemplary alert module 509 and the timing module 510. The alert module 509 may transmit alerts back to a user communicating with merchant tool module 120. For example, the alerts may include an error in upload alert, an inconsistent characteristic association alert, a user input required alert, etc.) In another embodiment, the alert module 509 may automatically notify a seller that at least one of the plurality of characteristics within the display module 522, the product module 524, the schedule module 526, the price module 528, and/or the quantity module 530 cannot be associated because of an error in associating the characteristic to a listing. The timing module 510, which is described in detail with reference to FIG. 6 may receive products having associated attributes.

In addition, the timing module 510 may also prepare listings that are to be initiated on the network-based marketplace 12. By associating time phase elements to each listing, the timing module 510 generates "staged listings". For example, the timing module 510 may identify or define when a particular listing (configured according to the various attributes) is to be presented live to users of the networked-based marketplace 12, how long the listing is to be maintained in the marketplace 12, and so on. The timing module 510 may thus generate staged listings 516 that may then be uploaded onto the network-based marketplace 12.

The timing module 510 may also use a jitter application to apply a time-phased jitter upon the individual listings (e.g., a plurality of listings for the same product may start/end at different times) to create time jittered listings. A time-phased jitter is a variation in the time a listing is to start or end in order to allow for multiple listings of the same product to list or start at slightly different times in order to allow potential buyers multiple opportunities to purchase a particular type of product. (e.g., for a sale for ten widgets over an auction type trading format within a network based marketplace 12, all ten widgets may be individually listed and begin and end a few minutes or a few hours apart so as to allow buyers multiple opportunities to submit a successful bid).

Figure 6:
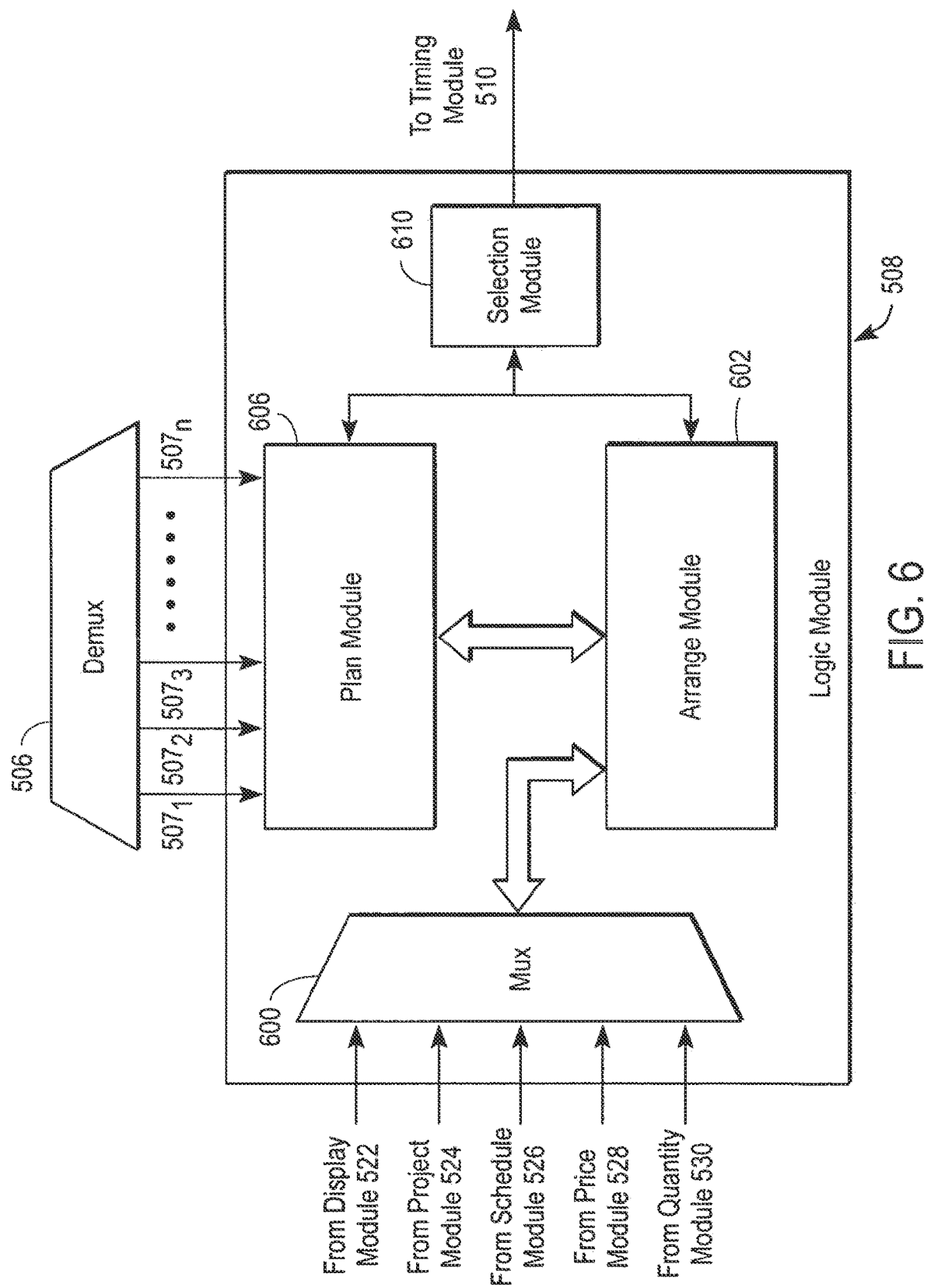
FIG. 6 is a functional view of the logic module within the merchant tool module, according to one exemplary embodiment.

Exemplary detail of the logic module 508 is shown in FIG. 6. The logic module 508 in FIG. 6 includes a multiplexer 600, a plan module 606, an arrange module 602, and a selection module 610. The multiplexer 600 may, for example, receive characteristic information from the display module 522, from the project module 524, from the schedule module 526, from the price module 528, and from the quantity module 530, or any other modules that may be included in other embodiments. For example, characteristics may be stored within tables as previously described in FIG. 3. The multiplexer 600 may then pass the information onto an exemplary arrange module 602 after aggregating all the different combinations of characteristic information that can be applied to a particular listing on a network-based marketplace 12. It should be noted that the multiplexer 600 (and all other demultiplexers and multiplexers shown in FIGS. 1-16) are merely illustrative, and implementations of the present disclosure may or may not require the use of multiplexer 600. Alternatively, any operation that can combine characteristics received from a plurality of modules into a table for use by the arrange module 602 may be used instead of multiplexer 600.

The arrange module 602 may arrange how particular characteristics will be displayed when a listing is finally available to users on the marketplace 12. A logic algorithm may automatically determine how listings will be arranged and displayed on a network-based trading marketplace. In one embodiment, the plan module 606 may receive information from the demux 506 in the form of individual products $507_1$ to $507_n$, and automatically determines which attributes are to be applied to the products to be listed on a network-based marketplace 12. For example, attributes may include factors such as which items are to be listed, with what characteristics the items should be listed, and when a particular item is to be listed). The arrange module 602 and the plan module 606 may communicate by coordinating which particular attribute and characteristic will be associated with the particular listing. This information may then be provided to the selection module 610 that prepares the listings to be transmitted to the timing module 510 as previously described in FIG. 6. Thus, using the various attributes associated with a listing, the logic module 508 may generate a listing for presentment to the users of the marketplace 12 at a time (or times when listings for the same type or similar items are staggered) determined by the timing module 510. For example, a seller defined number of items may go "live" or be listed on a selected day and, in a staggered fashion, further listings for a second user defined number of items may go live on another day. Thus, listing may be staggered in an automated fashion in the network-based marketplace 12.

Figure 7A:
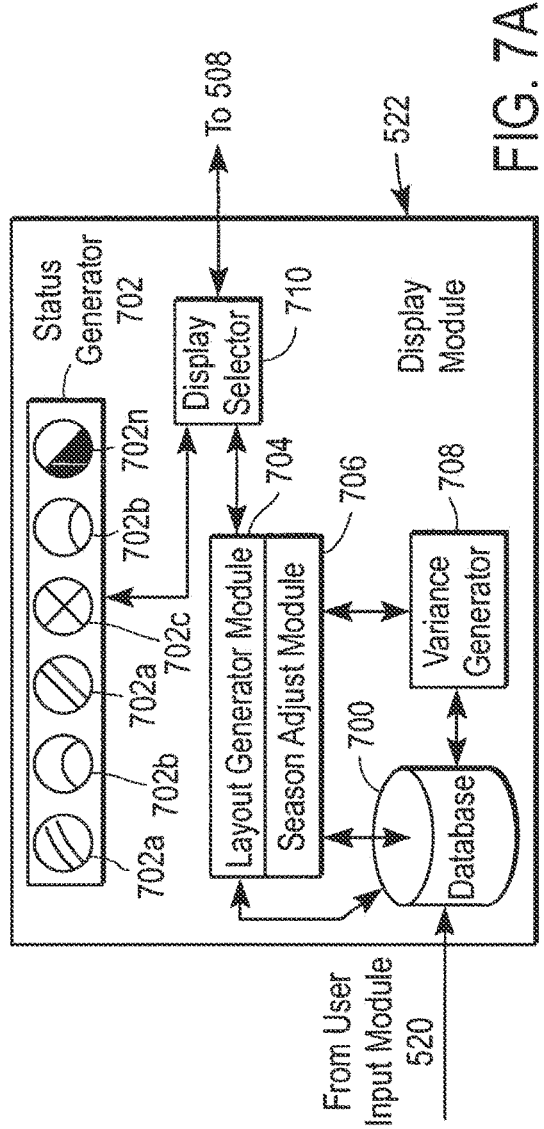
FIG. 7A-FIG. 7E illustrates a display module, a price module, a quantity module, a schedule module, and a product module within the merchant tool module, according to one exemplary embodiment.

FIG. 7A illustrates an exemplary embodiment of the display module 522. The display module 522 may include information (e.g., in the form of a template) for preparing a particular listing having a number of display attributes. In one embodiment, the display module 522 includes a status generator 702, a display selector 710, a layout generator 704, a season adjust 706, a database 700, and a variance generator 708. The layout generator 704 may determine what type of background layout a particular new listing may contain, and the season adjust 706 may determine which display characteristics (colors, themes, music, etc.) is associated for a particular annual season or holiday. The variance generator 708 may operate to apply variation to each listing so as to allow multiple listings of the same product to appear with a slightly different background. The status generator 702 may determine what priority status (e.g. 702a, 702b, 702c, and/or 702n) a particular listing should have. For example, a status color of red might indicate that a particular listing is on clearance sale, while a status color of gray might indicate that an input variable is missing.

In one embodiment, the status generator may provide information about a particular display characteristic within the plurality of defined characteristics within the display module 522. The database 700 may, for example, store the various layouts generated by the layout generator 704, season adjust 706, and the variance generator 708. The display selector 710 may receive an input from a user and selects what characteristics to apply to a particular listing before sending the display characteristics to the logic module 508. In one embodiment, the plurality of defined characteristics within the layout generator 704 and season adjust 706 within the display module 522 are automatically generated for at least one characteristic.

Figure 7C:
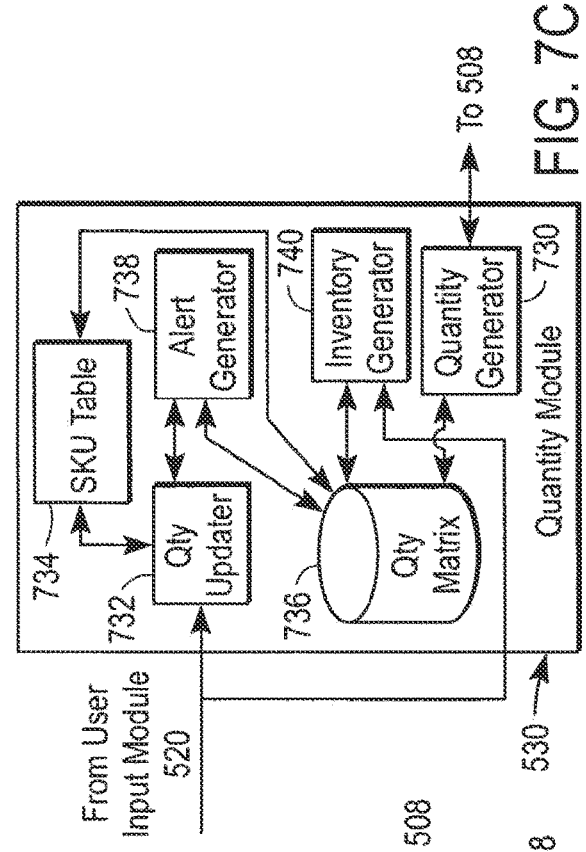
Figure 7B:
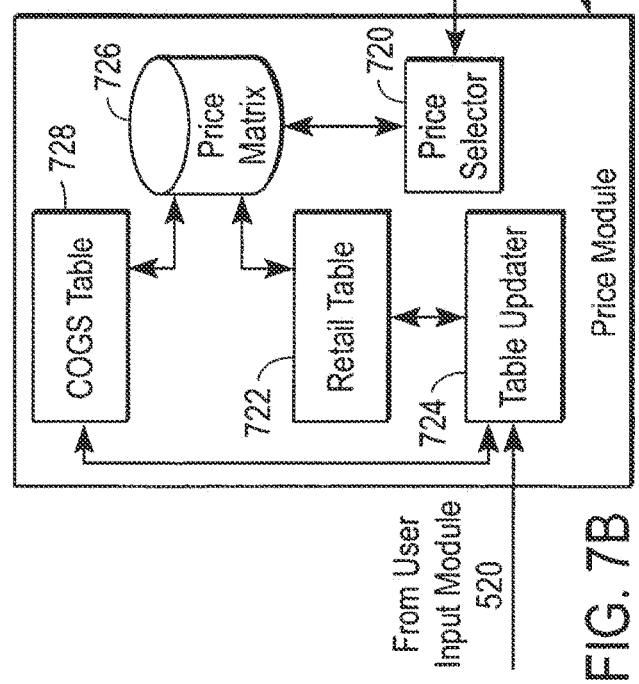

The exemplary price module 528 shown in FIG. 7B includes a COGS (Cost of Goods Sold) table 728, a price matrix 726, a retail table 722, a table updater 724, and a price selector 720. An input is received from the user input module 520 into the table updater 724. The COGS table 728 may include information about the cost of goods that are to be sold through listings on the network based trading marketplace 12. The retail table 722 may include information about the suggested retail price of various items to be listed for sale on the network-based marketplace 12. The table updater 724 may receive an input from the user input module 520 and triggers changes to either the COGS table 728, or the retail table 722. The COGS table 728 and the retail table 722 may provide listing data into the price matrix 726, which maintains a central database of all price information to use in a particular listing.

The price module 528 may also include additional tables for various price points that a particular high-volume seller may wish to sell items for in addition to the COGS table 728 and the retail table 722. The price matrix 726 may include a mathematical operation that generates a factor to apply to the cost of goods price stored in the COGS table 728 or the suggested retail price of a particular product within the retail table 722. For example, a particular product may be listed for 20% above cost, or 10% below list price). In one embodiment, one of the predefined price characteristics within the price module 528 is automatically generated based on a price level selected by a user accessing the price module 528 through the user input module 520 and who inputs their selection into the table updater 724.

The quantity module 530 shown in FIG. 7C illustrates a SKU table 734, a quantity updater 732, an alert generator 738, a quantity matrix 736, an inventory generator 740, and a quantity generator 730. The SKU table 734 includes information about how many of a particular product is typically associated with a stock keeping unit at the warehouse of a high-volume seller. The quantity updater 732 may receive a user input from the user input module 520 and updates particular fields within the SKU table 734 and the alert generator 738.

The quantity matrix database 736 in the quantity module 530 may store information about various replenish inventory (e.g., a replenish inventory factor may be a minimum stock keeping unit at a particular seller) and quantity factors (such as quantity profile, quantity per listing, etc.) received from the inventory generator 740 and the quantity generator 730. In one embodiment, the inventory generator 740 may receive input from the user input module 520. The alert generator 738 may monitor the status information within the quantity matrix 736 and may generate alerts that can be sent from the quantity module 530 when particular inventory runs low. For example, the alert generator 738 may send out an alert that a particular quantity of products is running low. The quantity generator 730 may communicate quantity characteristics to the logic module 508. For example, the quantity characteristics may include a quantity profile name, a product name, a quantity per listing, etc.)

Figure 7D:
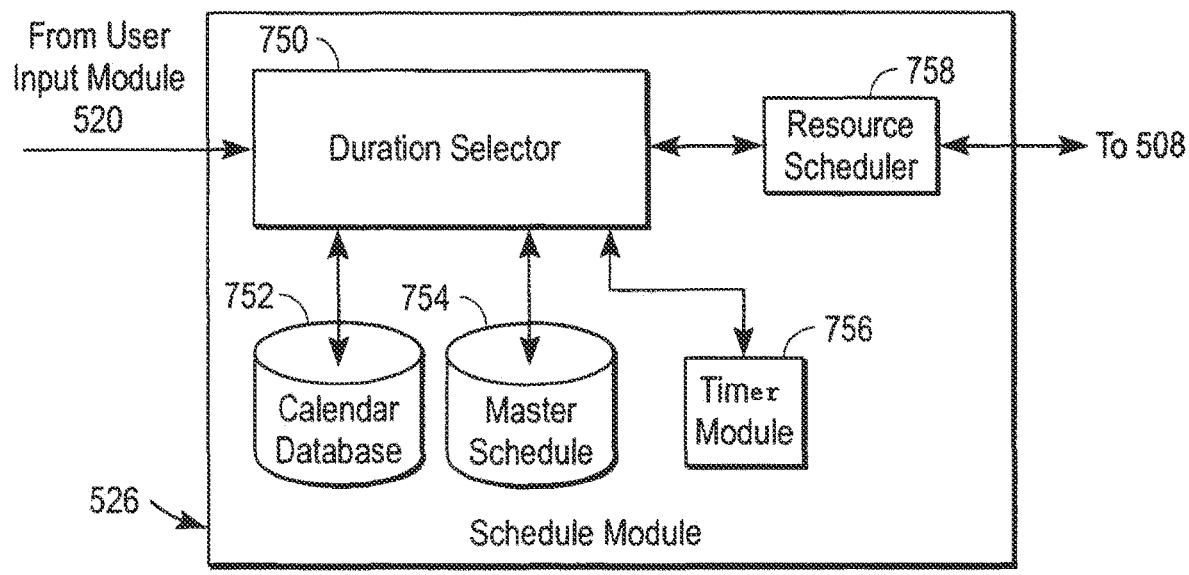

FIG. 7D illustrates exemplary detail of the schedule module 526. The schedule module 526 may include a duration selector 750, a calendar database 752, a master schedule 754, a timer module 756, and a resource scheduler 758. The duration selector 750 may determine which days a particular listing will run. For example, a listing may run between Friday and Monday of each week. The duration selector 750 may receive an input from the user input module 520 that instructs when a particular listing is to run. The duration selector 750 may communicate with a calendar database 752, a master schedule 754, and a timer module 756. The calendar database 752 may include the most recent calendar information, and may be a custom calendar based on the operating schedules of a particular high-volume merchant. For example, when a particular merchant may receive scheduled deliveries, or when the warehouse of a particular merchant is not closed for holiday. The master schedule 754 may include a match table of when items are to be received and when they are scheduled for listing within a network based marketplace 12. The timer module 756 may determine how many days are remaining before the particular schedule is to run. The resource scheduler 758 may communicate with the logic module 508 after receiving schedule characteristics from the duration selector 750. For example, the schedule characteristics may include a listing format, a quantity per schedule, a schedule profile name, a fixed/auction format, etc.

Figure 7E:
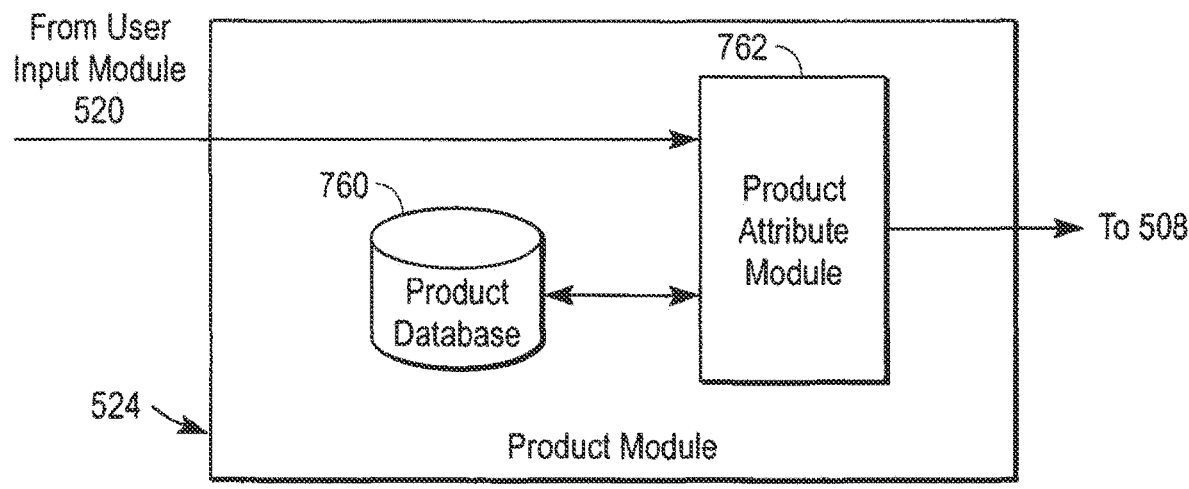

FIG. 7E illustrates an exemplary embodiment of the product module 524. The product module 524 may include a product database 760 and a product attribute module 762. The product database 760 may include information about specific characteristics about a particular type of product. For example, specific characteristics may identify what color a particular product is available in. In one embodiment, the product database 760 may include the product attributes table 118 as shown in FIG. 4. The product attribute module 762 may receive an input from the user input module 520 and may associate particular characteristics (e.g., product profile name, recommended display, description) to a particular product. This information may be stored within the product database 760. The product attribute 762 then communicate the product characteristic information to the logic module 508. In one embodiment, at least one of the plurality of predefined characteristics within the product attribute 762 are automatically generated based upon a predefined product attribute stored within the product database 760 within the product module 524.

The characteristics stored within the display module 522, the product module 524, the schedule module 526, and the price module 528 may be embodied in one or more templates (e.g., reusable pre-arrangements of data that can be applied to future listings). These templates may be created by a seller from scratch, or may be created from existing listings. In one embodiment, templates may include all information included in a preexisting listing. In another embodiment only particular aspects of a profile within one of the modules may be included within a template (e.g., a user may not have to elect to use all portions of a listing to include within a template). For example, only an aspect such as color within a profile of a particular product within the product module 524 may be used for a template. A user may alternatively select multiple products 507 to leverage the same template when listing items for sale (e.g., a seller might use a standard template for a group of products or services with similar attributes). Furthermore, the templates may be grouped into products having their own set of auction parameters (e.g., specific to the laws and customs of a particular nation, stock keeping unit parameters, categories, durational limitations, etc.). The categories may include geographical (e.g., which country something is to be sold in) and time phased markers (e.g., time limits for listing and/or a unique marker within the listing) according to one embodiment.

Figure 8:
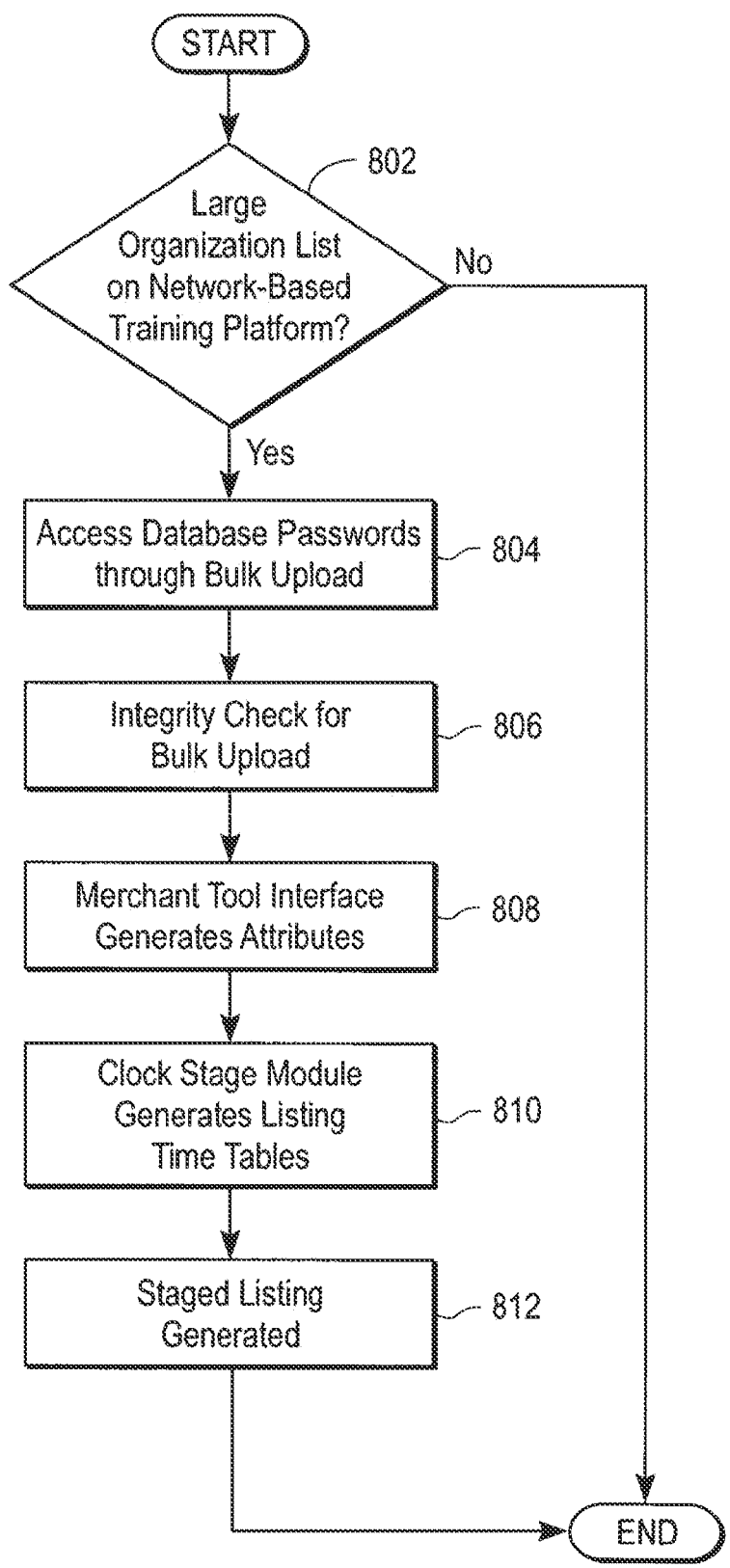
FIG. 8 is a process flow illustrating an application of the merchant tool module by a large organization within a network-based trading marketplace, according to one exemplary embodiment.

FIG. 8 illustrates an exemplary process flow to allow a high-volume seller to prepare listings. In operation 802, a large organization decides whether to list items on a network-based marketplace 12. If the large organization elects to do this, then, in operation 804, database passwords are accessed through the bulk upload feature. In one embodiment, a bulk uploader 504 as described in FIG. 5 performs the operation shown in 804. In operation 806, an integrity check for the bulk upload is performed. The bulk uploader 504 may also perform an integrity check, or alternatively the integrity may be checked by a logic module 508. In operation 808, the merchant tool interface generates attributes. The merchant tool interface referred to in operation 808 may be the logic module 508 as shown in FIG. 5, and the interface may be implemented through the various modules illustrated in FIG. 6. In operation 810, the timing module generates listing time tables. The timing module may be the timing module 510 as described in FIG. 5. In operation 812, stage listings are generated.

FIG. 9 illustrates a match grid or table 900. In the match table 900 including, a product identifier 910 and exemplary listing criteria. The listing criteria includes a time start 920, a time end 930, a duration 940, a display type 950, a schedule type 960, a price type 970, a quantity type 980, and a product attribute 990. Any one or more listing criteria may be associated with any one or more products $A_0$ through $A_n$ and $B_0$ through $B_n$, using the match table 900. For example, product $A_0$ through $A_n$ may be different physical units of a first product, whereas products $B_0$ through $B_n$ may be different physical units of a second product. In one embodiment, any number of products can be listed under the product identifier 910. In one embodiment of the disclosure, the match table 900 is located within the arrange module 602 within the logic module 508 as illustrated in FIG. 6. Time start 920 may indicate when a particular product listing is to begin. The time end 930 may indicate when a particular product listing is to end. In one embodiment, the time start 920 and time end 930 are generated by the timing module 510.

The duration 940 indicates what days a week a particular product is to be listed. In one embodiment, the duration 940 may be generated by duration selector 850 the schedule module 526 as described in FIG. 7D. The display type 950 may include information about what type of display characteristics are to be associated with a particular type of product listed in product identifier 910. In one embodiment, the display type 950 is generated by the display module 522 shown in FIG. 7A. The schedule type 960 may indicate what type of schedule a particular item to be listed is placed under. For example, the schedule type 960 might be a particular type of master schedule 754 as described in FIG. 7D. The price type 970 may indicate a particular price characteristic that is provided by a price matrix 726 within a price module 528 as shown in FIG. 7B. The quantity type 980 may indicate how many of a particular type of product listed under product identifier 910 are available to list on the network-based marketplace 12. The quantity type 980 may be stored within the quantity matrix 736 shown in the quantity module 530 in FIG. 7C. The product attribute 990 may indicate information about a particular product attribute that is associated with a particular listing in one embodiment. The product attribute 990 may include product characteristics stored in a product database 760 as shown in product module 524 in FIG. 7E in one embodiment.

Figure 10:
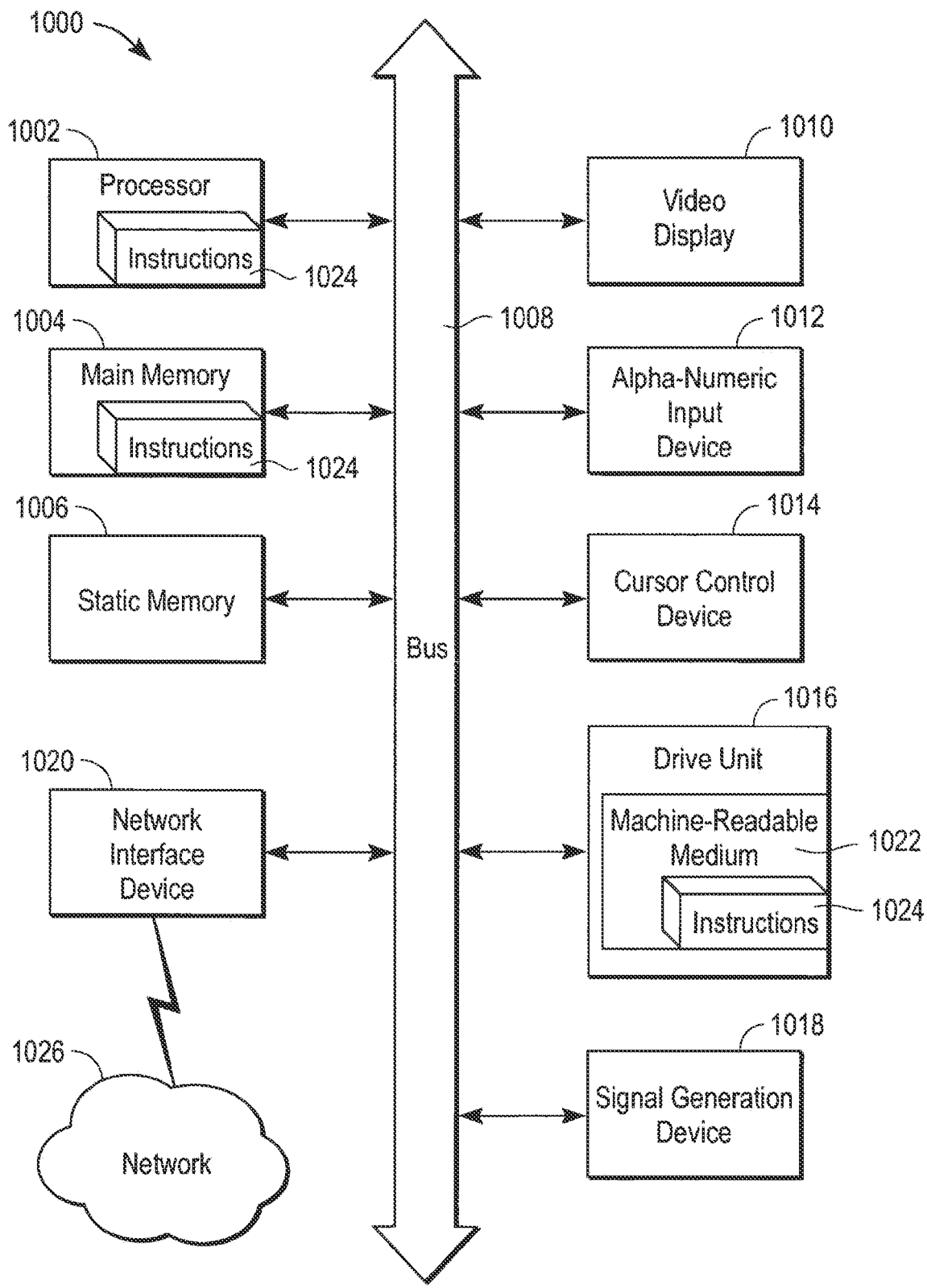
FIG. 10 shows a diagrammatic representation of machine in the exemplary form of a computer system, according to one exemplary embodiment.

FIG. 10 shows a diagrammatic representation of machine in the exemplary form of a Computer System 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. The Exemplary Computer System 1000 includes a Processor 1002 (e.g., a central processing unit (CPU) a graphics processing unit (GPU) or both), a Main Memory 1004, and a Static Memory 1006, which communicate with each other via a Bus 1008. The Computer System 1000 may further include a Video Display Unit 1010 (e.g., a liquid crystal display (LCD) or a cathode ray tube (CRT)). The Computer System 1000 also includes an Alpha-Numeric Input Device 1012 (e.g., a keyboard), a Cursor Control Device 1014 (e.g., a mouse), a Disk Drive Unit 1016, a Signal Generation Device 1018 (e.g., a speaker) and a Network Interface Device 1020. The Disk Drive Unit 1016 includes a Machine-Readable Medium 1022 on which is stored one or more sets of instructions (e.g., Software 1024) embodying any one or more of the methodologies or functions described herein.

The Software 1024 may also reside, completely or at least partially, within the Main Memory 1004 and/or within the Processor 1002 during execution thereof by the Computer System 1000, the Main Memory 1004 and the Processor 1002 also constituting machine-readable media. The Software 1024 may further be transmitted or received over a Network 1026 via the Network Interface Device 1020.

While the Machine-Readable Medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Figure 11:
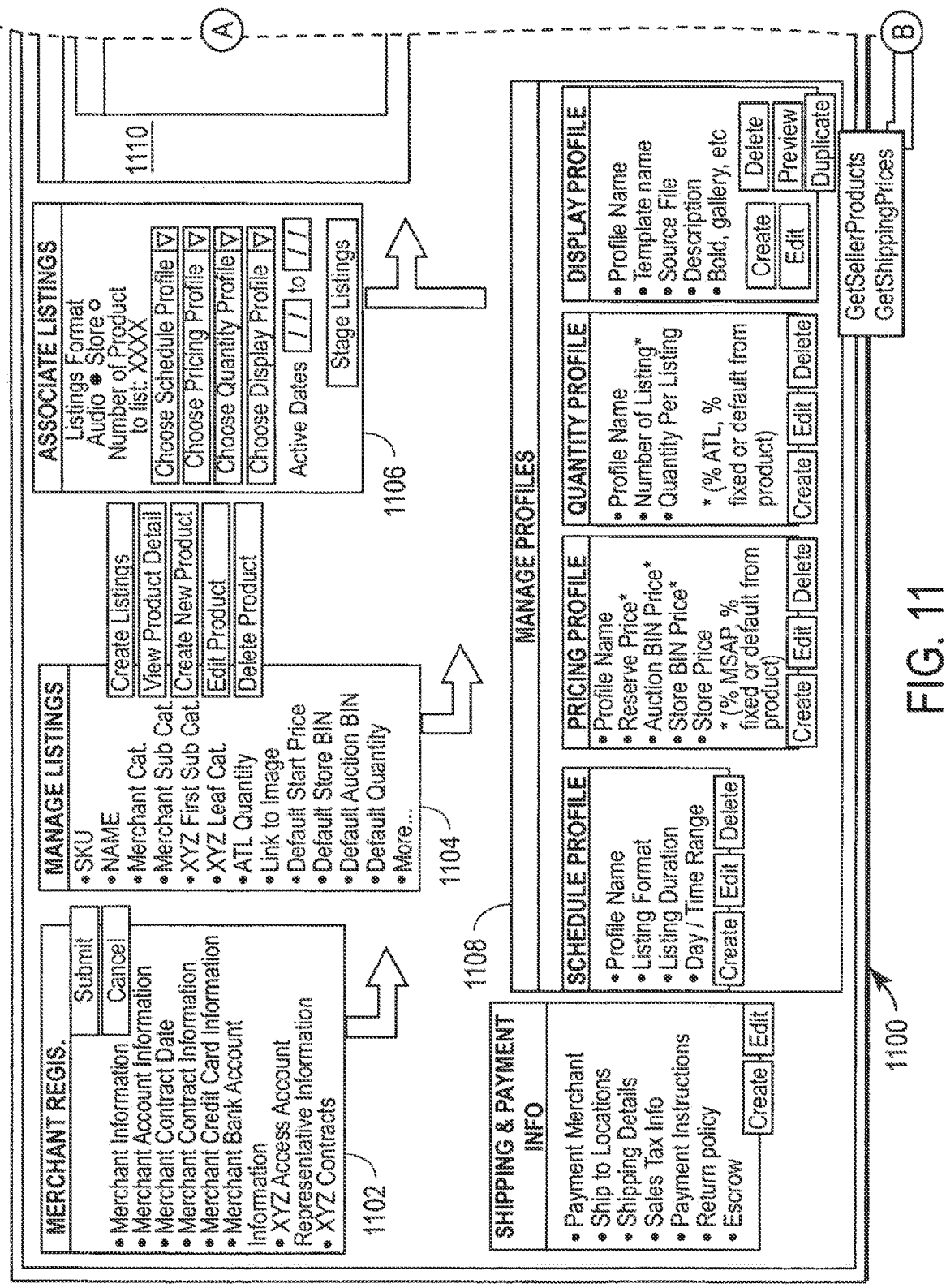

FIG. 11 illustrates an exemplary merchant tool module user interface view 1100. In one embodiment, the user interface 1100 may be controlled by a user through the Internet. A merchant registration window 1102 allows a high-volume seller to register onto network-based marketplace 12 and select options for accessing the merchant tool module for managing new listings. The manage listings window 1104 allows a merchant to upload and classify inventory for sale. In one embodiment, the manage listings window 1104 may be performed by the bulk uploader 504 as described with reference to FIG. 5. The associate listings window 1106 allows a merchant to select a profile they wish to use to apply to a particular new listing. In one embodiment, the associate listing window 1106 may be automatically performed by the merchant tool module 120, as previously described in FIG. 5.

The proposed listing information with their associated profiles are then fed from the associate listings window 1106 into a staged listing management module 1110 that manages the posting of the proposed listing information on the network-based marketplace 12. In one embodiment, the staged listing management module 1110 may receive staged listings 516 from the timing module 510 within the merchant tool module 120 as previously described with reference to FIG. 5. The manage profiles window 1108 allows a user to change particular characteristics for a particular type of product manually. In one embodiment, the manage profiles window 1108 is performed by the user input module 520 as previously described in FIG. 5.

Figure 12:
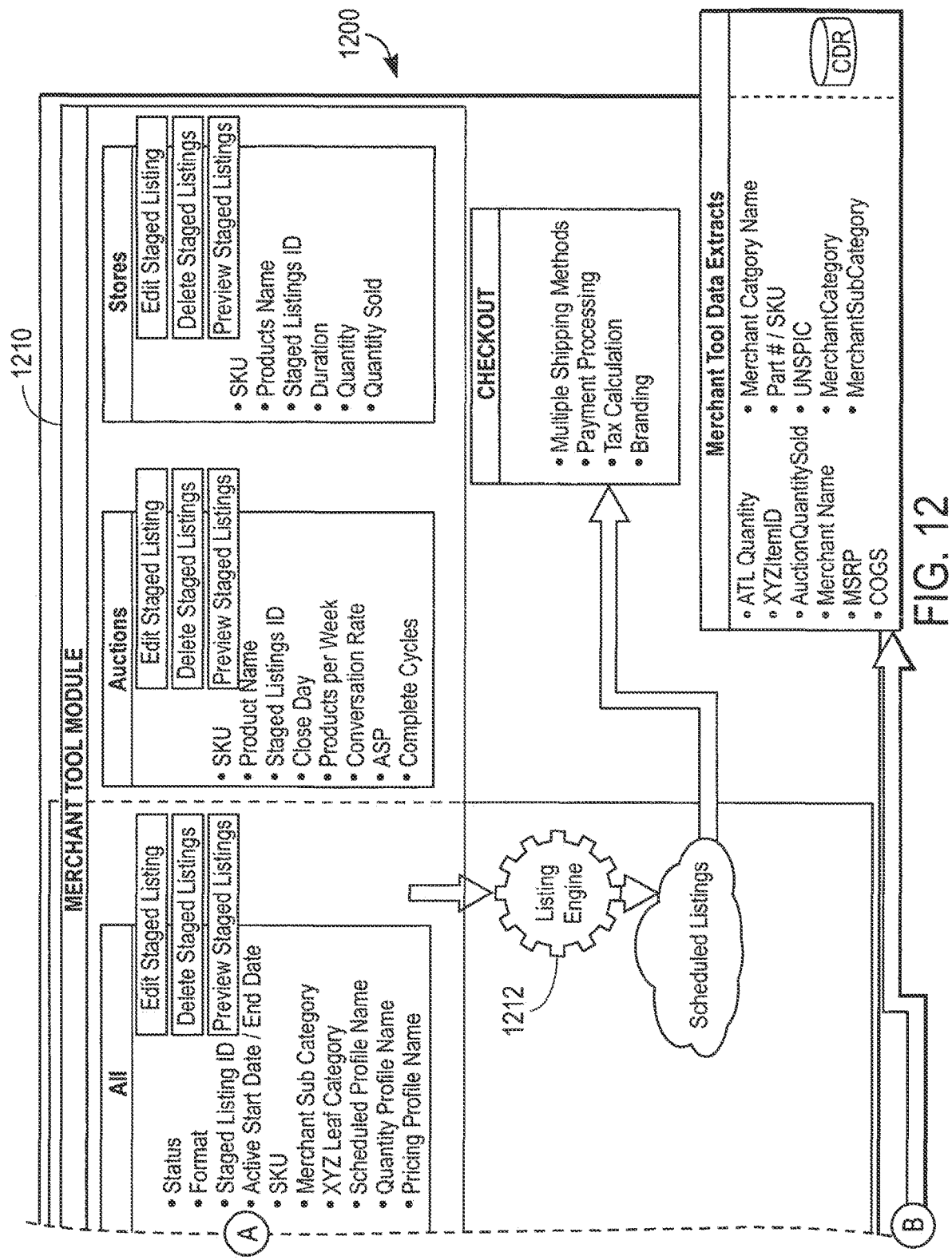

FIG. 12 illustrates an exemplary user view 1200 of the merchant tool module 1210. The listing engine 1212 may receive staged listings 516 from the timing module 510 as described with reference to FIG. 5 according to one embodiment. In one embodiment, the user view 1200 is a dashboard view that a high-volume seller can use to monitor key performance indicators. In another embodiment, the user view 1200 generates alerts through the alert module 509 within the merchant tool module 120 as previously described in FIG. 5.

FIG. 13 illustrates an exemplary user view for manually inputting stage listing criteria for a particular listing. In one embodiment, the user view illustrated in FIG. 13 may be accessed by a user through the user input module 520 as described with reference to FIG. 5, and allow a user to select various preset profiles for listing products for sale within a network-based marketplace 12. In another embodiment, the user view in FIG. 13 may allow manual selection of product attributes stored within a match table 1000.

FIG. 14 illustrates an exemplary view 1400 of auction performance criteria and staged listing criteria that may be applied by the merchant tool module 120 according to one embodiment. The status 1402 may allow a user to select items that have certain display characteristics appropriate for a particular season in one embodiment (e.g., clearance items, seasonal items). Options within status 1402 may be generated by a status generator 702 within the display module 522 as described with reference to FIG. 7A according to one embodiment. The auction performance criteria 1404 may allow a high-volume seller to monitor how the listings generated by the logic module 508 have performed. The auction performance criteria includes conversion rate—last cycle, conversation rate—to date, ASP//Target—Last Cycle, and ASP/Target—To Date. Conversion rate—Last Cycle indicates how many items were sold out of the total prepared and listed by the logic module 508 for the last group of staged listings prepared by a timing module 510 with reference to FIG. 5. The Conversion rate—To Date allows a user to monitor conversion rate to date for a particular product based on a percentage category. The ASP/Target—Last Cycle and ASP/Target—To Date indicate the average selling price target percentage match for the last group of staged listings, and for all listings placed by a high-volume seller onto a network-based marketplace 12. In one embodiment, the view 1400 may be used to track metrics from at least one of a group including profit, loss, revenue, seasonal preference, and listing effectiveness generated by the logic module 508.

In another embodiment, the view 1400 generates reports based on the characteristics and provides a dashboard view customizable for different service levels offered to a seller. For example, a particular seller may want detailed reports about the effectiveness of his listings if the particular seller pays an added subscription fee). In one embodiment, the reports generated by the view 500 include an average selling price report, and an average time to sell report.

FIG. 15 illustrates an exemplary user view 1500 of the product attribute module 524 as previously described with reference to FIG. 7B. In one embodiment, the product attribute module 524 determines what price a particular item is to be listed for, the physical warehouse location of the item to be listed, the shipping and handling costs associated with a particular item to be listed, and the product specifications of an item to be listed. The user view 1500 shown in FIG. 15 may be viewed by a user through a user input module 520 as previously described with reference to FIG. 5.

Figure 16:
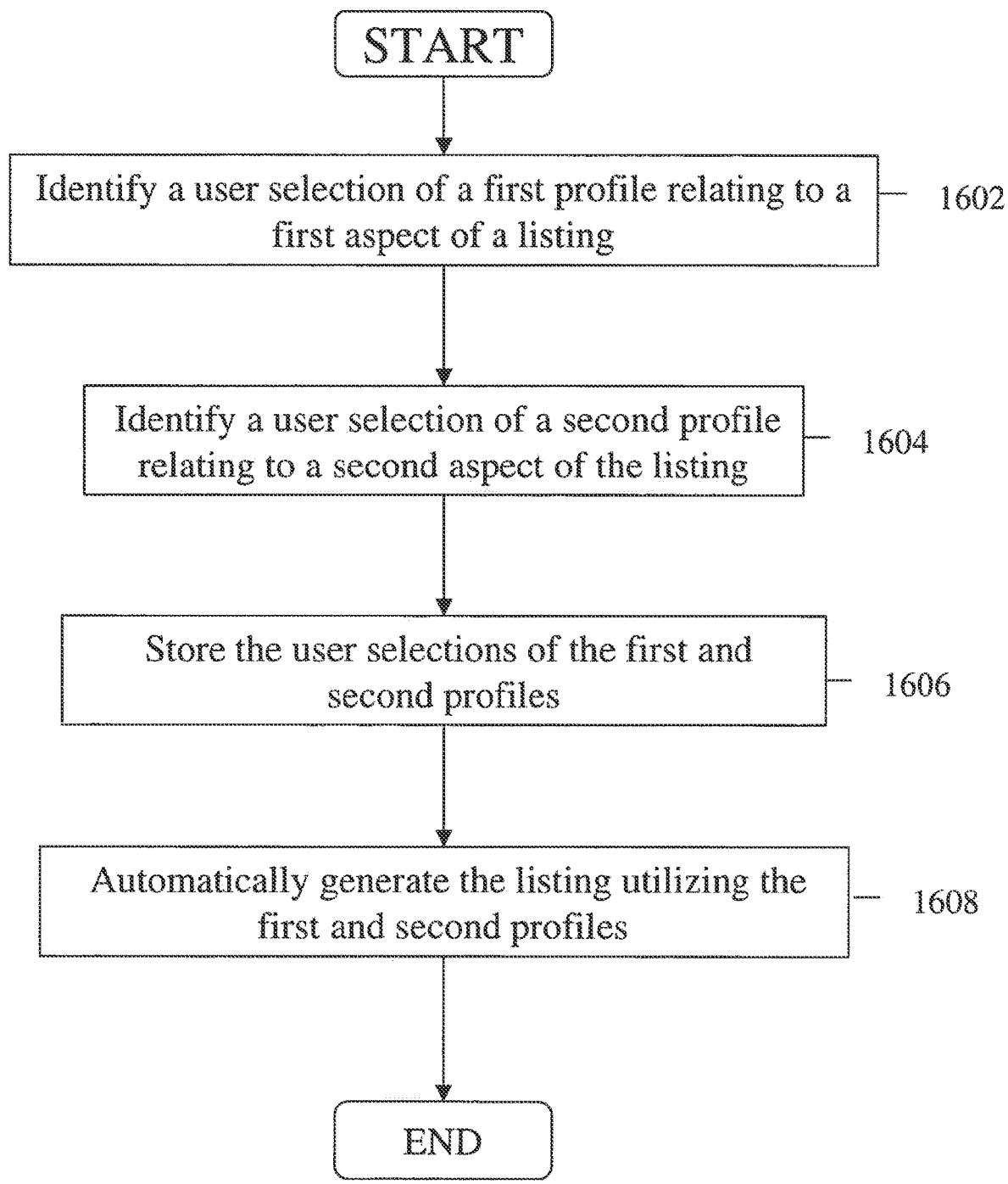
FIG. 16 illustrates a process flow for automatically generating a listing after identifying and storing a user selection of a first and second profile.

FIG. 16 illustrates a process flow for automatically generating a listing after identifying and storing a user selection of a first and second profile. In operation 1602, a user selection is identified of a first profile relating to a first aspect of a listing. In operation 1604, a user selection is identified of a second profile relating to a second aspect of a listing. In one embodiment, a user may identify an aspect of a profile within the display module 522, the product module 524, the schedule module 526, and the price module 528 (as in FIG. 5) that they wish to use. (e.g., a user may identify a selection of an aspect such as autumn or spring of a first profile within the display module 522 and an aspect such as retail price within a second profile within the price module 528, for example) A user may provide an input to change or edit a profile through a web based user input module 520 as shown in FIG. 5. In operation 1606, the user selections of the first and second profiles are stored. In one embodiment, the first profile and the second profile are stored within the non-volatile memory 514 as in FIG. 5. In operation 1608 the listing utilizing the first and second profiles is automatically generated. In one embodiment, the listing is automatically generated by a logic module 508. In another example, the profiles may be created by automatic extraction from an enterprise resource planning system by a bulk uploader 504. In another embodiment, a user input may define the contents within a profile. The first and second profiles may be selected from a first and second set of profiles respectively in one embodiment (e.g., the profiles may be grouped by logically grouped sets such as by category).

A method and system to managing high-volume listings within a network-based trading environment have been described. Although the present disclosure has been described with reference to specific exemplary embodiments, it will be evident that various modifications and changes may be made to these embodiments without departing from the broader spirit and scope of the disclosure.

Accordingly, the specification and drawings are to be regarded in an illustrative rather than a restrictive sense.

What is claimed is:

1. A method, comprising:
   receiving access to a database that includes a plurality of items to be listed on a network-based marketplace, each of the plurality of items including one or more attributes arranged in an attribute table;
   receiving, using a bulk uploader associated with the network-based marketplace, information corresponding to the plurality of items;
   verifying an integrity of the information corresponding to each of the plurality of items;
   generating a manage listing interface that includes the information corresponding to the plurality of items; and
   providing the manage listing interface to a display of a computing device.

2. The method of claim 1, wherein the manage listing interface includes verification information of each of the plurality of items.

3. The method of claim 1, further comprising determining whether at least one of the plurality of items is a staged listing.

4. The method of claim 1, further comprising automatically adding additional information to at least one of the plurality of items based, at least in part, on the one or more attributes of the at least one of the plurality of items.

5. The method of claim 4, wherein the additional information is received from a second database.

6. The method of claim 1, wherein the database is a spreadsheet of a spreadsheet application.

7. The method of claim 1, wherein verifying the integrity of the information comprises determining whether any errors are present during an upload operation of the bulk uploader.

8. A system, comprising:
   at least one processor; and
   a memory communicatively coupled to the at least one processor and storing instructions that, when executed by the at least one processor, perform operations, comprising:
      receiving access to a database that includes information about a plurality of items for listing on a network-based marketplace, the information including an attribute of each of the plurality of items;
      receiving, using a bulk uploader associated with the network-based marketplace, the information about the plurality of items;
      verifying the information about each of the plurality of items;
      generating a manage listing interface that includes the information corresponding to the plurality of items; and
      providing the manage listing interface to a display of a computing device.

9. The system of claim 8, wherein the attribute of each of the plurality of items is stored in an attribute table.

10. The system of claim 8, wherein the manage listing interface includes verification information of each of the plurality of items.

11. The system of claim 8, further comprising instructions for determining whether at least one of the plurality of items is a staged listing.

12. The system of claim 8, further comprising instructions for automatically adding additional information to at least one plurality items based, at least in part, on the attribute that is associated with the at least one of the plurality of items.

13. The system of claim 12, wherein the additional information is received from a second database.

14. The system of claim 8, wherein the database is a spreadsheet of a spreadsheet application.

15. The system of claim 8, wherein verifying the information comprises determining whether any errors are detected during an upload operation of the bulk uploader.

16. A method, comprising:
   receiving access to a spreadsheet application that includes information about a plurality of items for listing on a network-based marketplace, the information including an attribute of each of the plurality of items;
   providing access to the spreadsheet application to a bulk uploader associated with the network-based marketplace;
   receiving the information about the plurality of items from the bulk uploader associated with the network-based marketplace;
   verifying an integrity of the information about each of the plurality of items;
   generating a manage listing interface that includes the information corresponding to the plurality of items; and
   providing the manage listing interface to a display of a computing device.

17. The method of claim 16, wherein the manage listing interface includes verification information of each of the plurality of items.

18. The method of claim 16, further comprising determining whether at least one of the plurality of items is a staged listing.

19. The method of claim 16, further comprising automatically adding additional information to at least one plurality items based, at least in part, on the attribute that is associated with the at least one of the plurality of items.

20. The method of claim 19, wherein the additional information is received from a second database.

* * * * *